(12) United States Patent
Yurash

(10) Patent No.: US 12,105,325 B2
(45) Date of Patent: Oct. 1, 2024

(54) MODE CONVERSION WAVEGUIDE SYSTEM

(71) Applicant: The Boeing Company, Chicago, IL (US)

(72) Inventor: Brett A. Yurash, Venice, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/649,169

(22) Filed: Jan. 27, 2022

(65) Prior Publication Data
US 2023/0236362 A1 Jul. 27, 2023

(51) Int. Cl.
*G02B 6/14* (2006.01)
*G02B 6/293* (2006.01)

(52) U.S. Cl.
CPC ............ *G02B 6/14* (2013.01); *G02B 6/29344* (2013.01)

(58) Field of Classification Search
None
See application file for complete search history.

(56) References Cited

U.S. PATENT DOCUMENTS

| 10,249,326 | B1 * | 4/2019 | Peng ................. | G11B 13/08 |
| 2007/0071388 | A1 * | 3/2007 | Lu .................... | G02B 6/12016 |
| | | | | 385/140 |
| 2014/0126855 | A1 * | 5/2014 | Onishi ............... | G02B 6/105 |
| | | | | 385/3 |
| 2014/0321823 | A1 * | 10/2014 | Koike-Akino ...... | G02B 6/12007 |
| | | | | 385/123 |
| 2016/0195676 | A1 * | 7/2016 | Yu .................... | G02B 6/107 |
| | | | | 385/11 |
| 2018/0088277 | A1 * | 3/2018 | Shi .................... | G02B 6/136 |

FOREIGN PATENT DOCUMENTS

| CN | 201000498 | 1/2008 |
| JP | 2015114378 A | 6/2015 |

OTHER PUBLICATIONS

Chack et al., "Broadband and low crosstalk silicon on-chip mode converter and demultiplexer for mode division multiplexing," Appl. Opt. 59, 2020, 8 pages.
Chen et al., "Waveguide mode converter based on two-dimensional photonic crystals," Opt. Lett. 30, 2005, 3 pages.
Driscoll et al., "Asymmetric Y junctions in silicon waveguides for on-chip mode-division multiplexing," Opt. Lett. 38, 2013, 4 pages.
(Continued)

*Primary Examiner* — Chris H Chu
(74) *Attorney, Agent, or Firm* — Yee & Associates, P.C.

(57) ABSTRACT

A method and mode conversion waveguide system for converting a mode of a light is provided. The light is sent through a single mode waveguide, wherein the light has a first mode while traveling through single mode waveguide. The light is sent from the single mode waveguide into a multimode interference region having connected to the single mode waveguide. The light is reflected with a cavity within the multimode interference region in a manner that causes the light to propagate away from the single mode waveguide. The light is output from multimode interference region, wherein the light has a second mode.

20 Claims, 16 Drawing Sheets

(56) References Cited

OTHER PUBLICATIONS

Frandsen et al., "Topology optimized mode conversion in a photonic crystal waveguide fabricated in silicon-on-insulator material," Opt. Express 22, 2014, 8 pages.
Linh et al., "Arbitrary TE0/TE1/TE2/TE3 Mode Converter Using 1×4 Y-Junction and 4×4 MMI Couplers," in IEEE Journal of Selected Topics in Quantum Electronics, vol. 26, No. 2, Mar.-Apr. 2020, 8 pages.
Lu et al., "Objective-first design of high-efficiency, small-footprint couplers between arbitrary nanophotonic waveguide modes," Optics Express, vol. 20, No. 7, 2012, 16 pages.
Xing et al., "Two-mode multiplexer and demultiplexer based on adiabatic couplers," Opt. Lett. 38, 2013, 3 pages.
Xu et al., "Silicon Integrated Nanophotonic Devices for On-Chip Multi-Mode Interconnects," Appl. Sci. vol. 10, No. 6365, 2020, 38 pages.
European Patent Office Extended Search Report, dated Jun. 19, 2023, regarding Application No. EP22202523.1, 9 pages.
Halir Robert et al: "Recent Advances in Silicon Waveguide Devices Using Sub-Wavelength Gratings", IEEE Journal of Selected Topics in Quantum Electronics, IEEE, USA, vol. 20, No. 4, Jul. 1, 2014 (Jul. 1, 2014), pp. 1-13, XP011537092, ISSN: 1077-260X, DOI: 10.1109/JSTQE.2013.2293754 [retrieved on Jan. 15, 2014].
Halir Robert et al: "Subwavelength metastructures for dispersion engineering in planar waveguide devices", Proceedings of SPIE, IEEE, US, vol. 8995, Feb. 19, 2014 (Feb. 19, 2014), pp. 89950U-89950U, XP060036174, DOI: 10.1117/12.2045727 ISBN: 978-1-62841-730-2.
Nicholas J Dinsdale et al: "Deep learning enabled design of complex transmission matrices for universal optical components", arxiv.org, Cornell University Library, 201 Olin Library Cornell University Ithaca, NY 14853, Sep. 24, 2020 (Sep. 24, 2020), XP081795175.
Wang Zhen et al: "Ultra-Compact and Broadband Silicon Two-Mode Multiplexer Based on Asymmetric Shallow Etching on a Multi-Mode Interferometer", 2020 Optical Fiber Communications Conference and Exhibition (OFC), OSA, Mar. 8, 2020 (Mar. 8, 2020), pp. 1-3, XP033767227,DOI: 10.1364/OFC.2020.W4C.2 [retrieved on Apr. 30, 2020].

\* cited by examiner

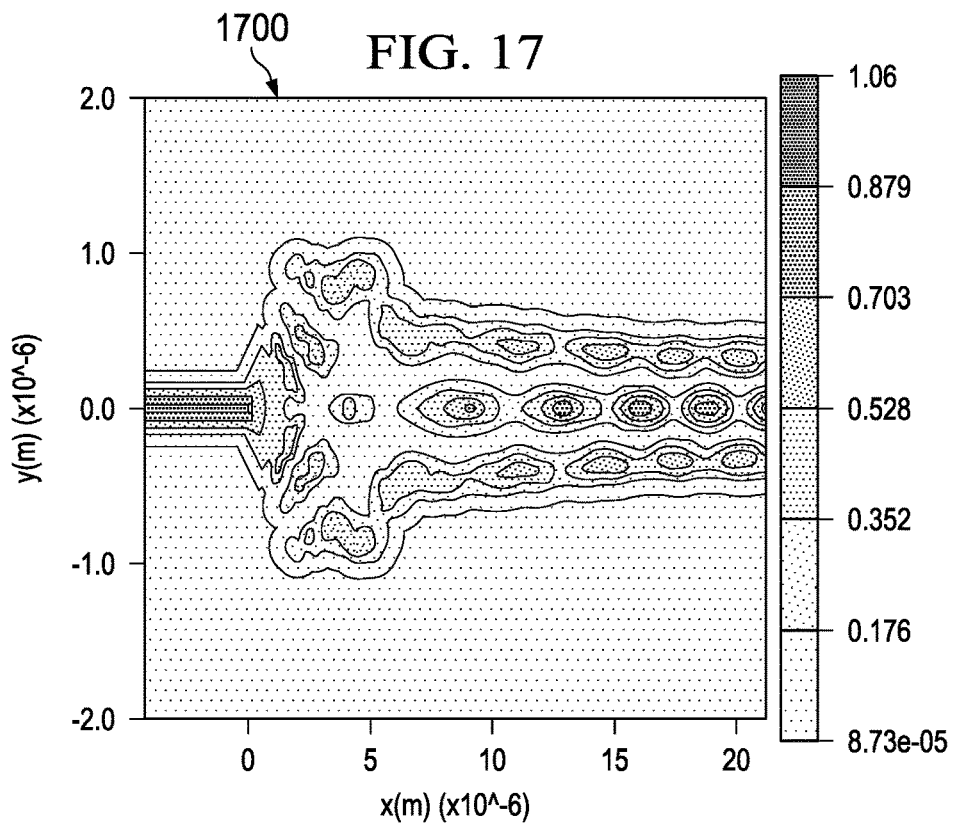
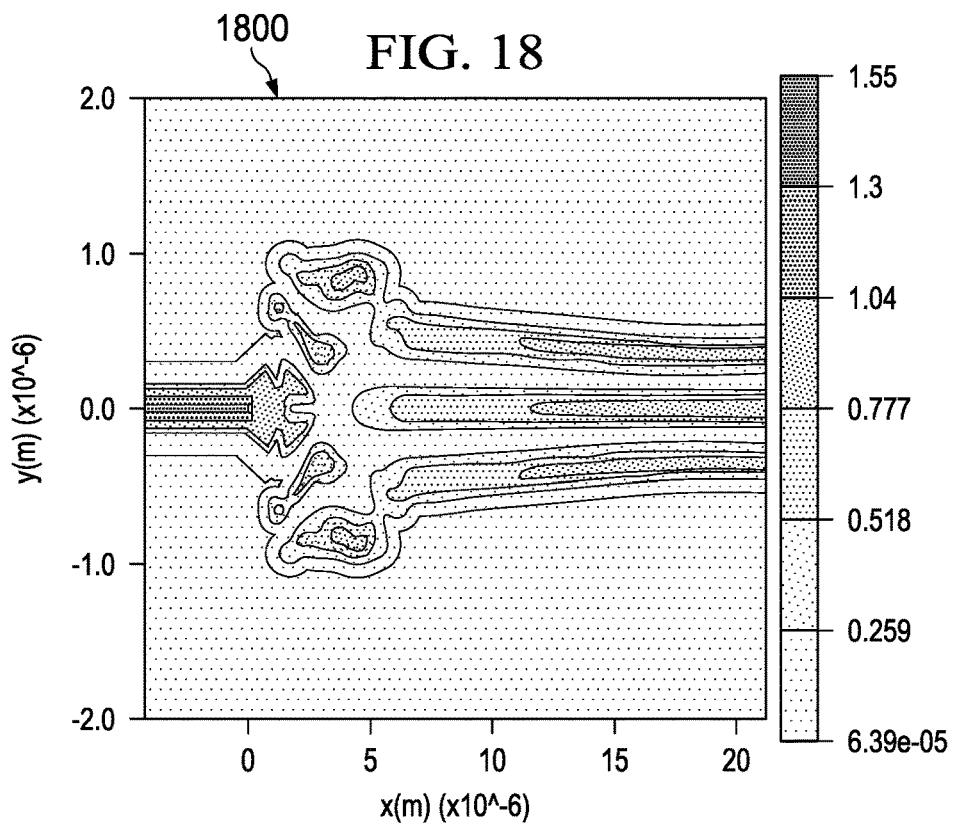

MODE CONVERSION WAVEGUIDE SYSTEM

BACKGROUND INFORMATION

1. Field

The present disclosure relates generally to optical waveguide structures and in particular, to mode conversion waveguide systems.

2. Background

Optical waveguides are physical structures that guide electromagnetic waves in an optical spectrum. These optical waveguides can be used as components in integrated optical circuits. With respect to quantum communications and processing, optical material structures can be used to create photon transmitters, repeaters, and other quantum devices for communications.

Optical waveguides can perform mode conversion in which the field pattern of the propagating waves can be changed. Mode converting optical waveguides can be used for various applications. For example, mode conversion can be implemented in optical waveguides to perform multiplexing or demultiplexing of optical signals.

In mode-division multiplexing schemes, light signals of a single carrier wavelength are independently carried by various optical modes in one multimode waveguide bus. In addition, nonlinear optical processes in waveguides, such as parametric down conversion, spontaneous four wave mixing, second harmonic generation, often use higher order modes in the nonlinear optical process. These nonlinear optical processes can be used to make, for example, heralded single photon sources, entangled photon sources, and optical parametric oscillators.

The optical waveguides performing mode conversions for optical signals often have losses during mode conversion. As a result, the efficiency of these optical waveguides in converting light from one mode to another mode may be less than desirable or practical. These losses can be undesirable or impractical for desired applications.

Therefore, it would be desirable to have a method and apparatus that take into account at least some of the issues discussed above, as well as other possible issues. For example, it would be desirable to have a method and apparatus that overcome a technical problem with performing mode conversions of optical signals with increased efficiency.

SUMMARY

An embodiment of the present disclosure provides A mode conversion waveguide system comprising a single mode waveguide; a multimode waveguide; a multimode interference region connected to the single mode waveguide and the multimode waveguide; and a cavity in the multimode interference region.

According to another illustrative embodiment, a method for converting a mode of a light is provided. The light is sent through a single mode waveguide, wherein the light has a first mode while traveling through single mode waveguide. The light is sent from the single mode waveguide into a multimode interference region having connected to the single mode waveguide. The light is reflected with a cavity within the multimode interference region in a manner that causes the light to propagate away from the single mode waveguide. The light is output from multimode interference region, wherein the light has a second mode.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 17 is an illustration of a graph depicting an electric field profile in accordance with an illustrative embodiment;

FIG. 18 is another illustration of a graph depicting an electric field profile in accordance with an illustrative embodiment;

DETAILED DESCRIPTION

Figure 1:
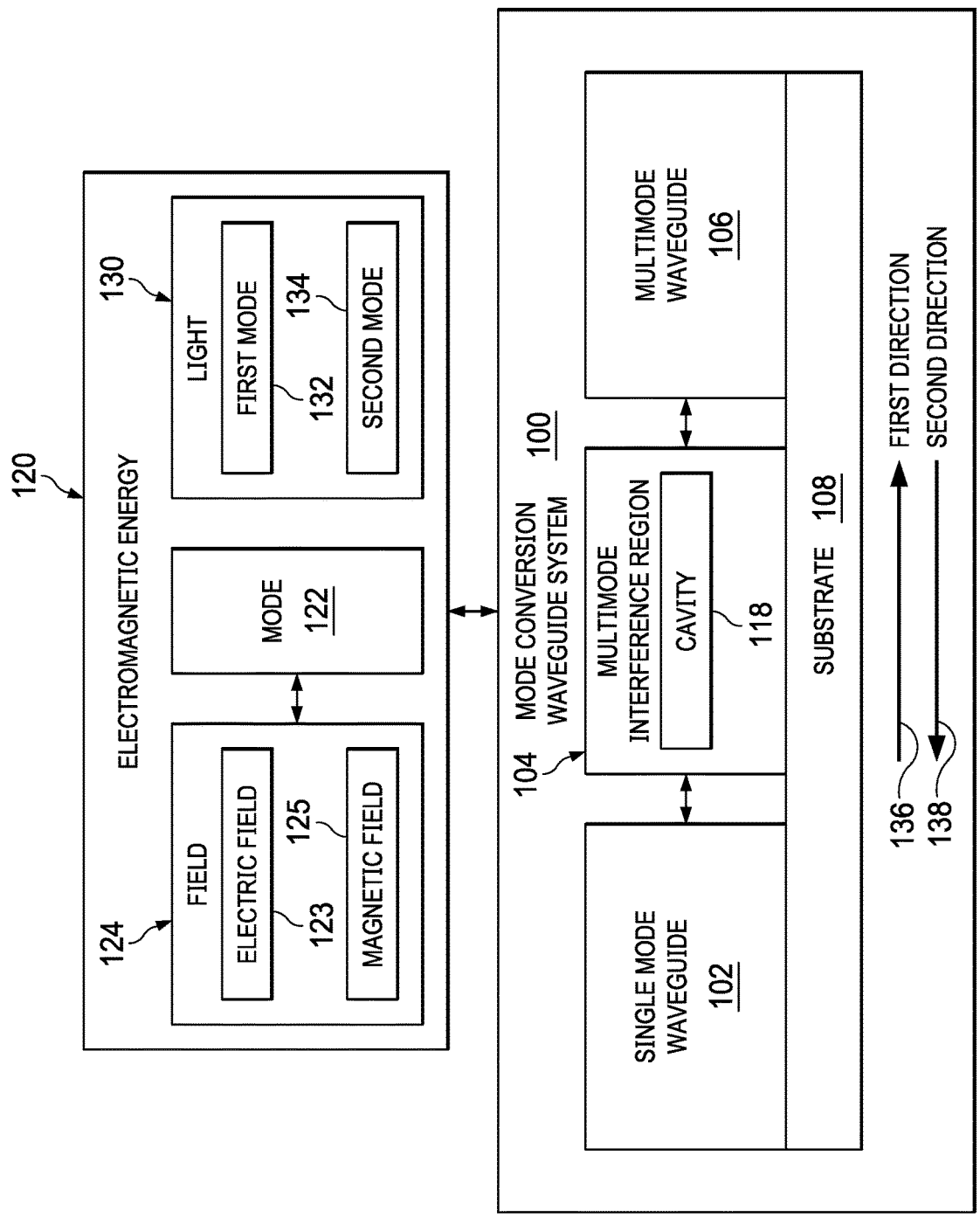
FIG. 1 is an illustration of a block diagram of a mode conversion waveguide system in accordance with an illustrative embodiment.

The illustrative embodiments recognize and take into account one or more different considerations. For example, the illustrative embodiments recognize and take into account that optical waveguides used for mode conversion can have undesired losses based on changes in the effective refractive indexes of the modes. Those embodiments recognize and take into account that some mode converter optical waveguides use a directional coupler that requires the effective refractive index of relevant modes to be suitably matched. The illustrative embodiments recognize and take into account that a change in the refractive index will change the effective refractive indices of the relevant modes by unequal amounts.

The illustrative embodiments recognize and take into account that with current designs for optical waveguides performing mode conversion, variations in fabrication processes and designs can result in different efficiencies when geometry and the refractive index changes. For example, materials used in mode converting optical waveguides can have a refractive index that cannot be controlled as precisely as desired. An example of one material in which the refractive index may be difficult control when fabricating an optical waveguide that performs mode conversion is silicon nitride. The illustrative embodiments recognize and take into account that the creation and later processing of a silicon nitride film can cause changes in the refractive index. The illustrative embodiments recognize and take into account that deposition time, deposition temperature, pressure, reactants flow rate and substrate temperature during the fabrication can be selected to change the chemical composition of the film, which in turn has an effect on the physical properties the film such as the refractive index.

The illustrative embodiments recognize and take into account with variations between the refractive index of the material and refractive index for the mode of the electromagnetic wave that propagates through the material, an undesired reduction the amount of mode conversion and transmission can occur. The illustrative embodiments recognize and take into account that it would be desirable to have an optical waveguide system that has increased tolerance to changes in the refractive index.

Thus, illustrative embodiments provide a method, apparatus, and system for mode conversion that is tolerant to refractive index changes. Detailed examples of the claimed structures and methods for optical waveguides are disclosed herein. However, it is to be understood that the disclosed examples are merely illustrative of the claimed structures and methods that may be embodied in various forms. In addition, each of the examples given in connection with the various embodiments is intended to be illustrative, and not restrictive.

Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

For purposes of the description hereinafter, the terms "upper," "lower," "right," "left," "vertical," "horizontal," "top," "bottom," and derivatives thereof shall relate to the embodiments of the disclosure, as it is oriented in the drawing figures. The terms "positioned on" means that a first element, such as a first structure, is present on a second element, such as a second structure, wherein intervening elements, such as an interface structure, e.g. interface layer, may be present between the first element and the second element.

In this disclosure, when an element, such as a layer, region, or substrate is referred to as being "on" or "over" another element, the element can be directly on the other element or intervening elements can also be present. In contrast, when an element is referred to as being "directly on", "directly over", or "on and in direct contact with" another element, intervening elements are not present, and the element is in contact with the other element.

The processes, steps, and structures described below do not form a complete process flow for manufacturing optical waveguides or integrated circuits. The disclosure can be practiced in conjunction with fabrication techniques currently used in the art for optical waveguides for semiconductor circuits, and only so much of the commonly practiced process steps are included as necessary for an understanding of the different examples of the present disclosure. The figures represent cross sections of a portion of an integrated circuit during fabrication and are not drawn to scale, but instead are drawn so as to illustrate different illustrative features of the disclosure.

With reference now to the figures and, in particular, with reference to FIG. 1, an illustration of a block diagram of mode conversion waveguide system is depicted in accordance with an illustrative embodiment. As depicted, mode conversion waveguide system 100 comprises single mode waveguide 102; multimode interference region 104, and multimode waveguide 106. In this illustrative example, multimode interference region 104 connects single mode waveguide 102 and multimode waveguide 106. In this illustrative example, single mode waveguide 102; a multimode waveguide 106; and multimode interference region 104 are formed on substrate 108. Substrate 108 can take a number different forms. For example, substrate 108 can be selected from a group comprising silicon dioxide ($SiO_2$), silicon nitride ($Si_xN_y$, in which x and y are stoichiometric ratios), hydrogenated silicon nitride—$Si_xN_y$:$H_z$, silicon oxynitride ($SiO_xN_y$), aluminum nitride (AlN), silicon carbide (SiC), lithium niobate (LiNbO3), aluminum gallium arsenide ($Al_xGa_{1-x}As$), siliconon (Si), and other suitable materials.

As depicted, single mode waveguide 102 is optically coupled to multimode interference region 104. Multimode interference region 104 optically connected to multimode waveguide 106. Further, mode conversion waveguide system 100 comprises cavity 118 located in multimode interference region 104.

In this illustrative example, electromagnetic energy 120 can travel or propagate through mode conversion waveguide system 100. This propagation of electromagnetic energy 120 through mode conversion waveguide system 100 can change mode 122 of field 124 in electromagnetic energy 120. In this illustrative example, field 124 can be at least one of electric field 123 or magnetic field 125.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In one illustrative example, electromagnetic energy 120 traveling through mode conversion waveguide system 100 is light 130 in this illustrative example. Cavity 118 in multimode interference region 104 causes light 130 having first mode 132 traveling from single mode waveguide 102 into multimode interference region 104 to reflect within multimode interference region 104 in a manner that the causes light 130 to have second mode 134.

In this illustrative example, depending upon the geometry of the structures within mode conversion waveguide system 100, a single guided TE or TM optical mode or more than one guided TE optical modes can be supported. For example, single mode waveguide 102 supports a single TE or TM mode, while multimode waveguide 106 can support a set of TE or TM optical modes.

In these illustrative examples, transverse electric (TE) modes means the electric field component of the guided mode is polarized in the plane of the substrate. Transverse magnetic (TM) modes mean the magnetic field is polarized in the plane of the substrate, or equivalently that the electric field is polarized perpendicular to the plane of the substrate. In the illustrative example, the fundamental $TE_{11}$ and $TM_{11}$ modes of a waveguide have a single peak in the electric field profile of the guided mode while higher order modes have more than one peak in their electric field profile.

In this illustrative example, light 130 has first mode 132 when traveling through single mode waveguide 102. In single mode waveguide 102, first mode 132 for light 130 can be a fundamental mode of light 130. Multimode interference region 104 causes light 130 to change from first mode 132 to second mode 134. Light 130 with second mode 134 is output from multimode interference region 104 to multimode waveguide 106.

In this illustrative example, cavity 118 causes light 130, such a fundamental mode light, traveling through multimode interference region 104 to reflect within the multimode interference region 104. Cavity 118 can perturb or alter field 124 of light 130 entering multimode interference region 104 to change mode 114 of light 130 from first mode 132 to second mode 134 when light is output from multimode interference region 104.

For example, light 130 travels in first direction 136 through mode conversion waveguide system 100 such that light 130 is converted from a lower mode to a higher mode. Light 130 having first mode 132 travels through single mode waveguide 102 and is input into multimode interference region 104 and is output from multimode interference region 104 into multimode waveguide 106 with second mode 134.

Additional light of other modes can be introduced into multimode waveguide 106 with light 130 having second mode 134. For example, light 130 of second mode 134 can have a mode of $TE_{31}$ and the additional light can have a mode of $TM_{31}$.

In this example, first mode 132 can be $TE_{11}$ optical mode and second mode 134 can be a $TE_{31}$ optical mode. In another example, first mode 132 can be a $TM_{11}$ optical mode and second mode 134 can be a $TM_{31}$ optical mode.

In another illustrative example, light 130 input into mode conversion waveguide system 100 is in a higher order mode and is input into multimode waveguide 106. In this illustrative example, light 130 and travels in second direction 138 through mode conversion waveguide system 100 such that light 130 can be converted to a lower order mode. light 130 having second mode 134 travels through multimode waveguide and is input into multimode interference region 104 and is output from multimode interference region 104 into single mode waveguide with first mode 132.

In this example, single mode waveguide 102 only allows light 130 lower order mode to pass not light 130 of higher order modes. As a result, single mode waveguide 102 can function as a filter to filter out what was not converted to the lower or fundamental mode.

With this example, first mode 132 can be a $TE_{11}$ optical mode and second mode 134 can be a $TE_{31}$ optical mode. First mode 132 can be a $TM_{11}$ optical mode and second mode 134 can be a $TM_{31}$ optical mode.

Figure 2:
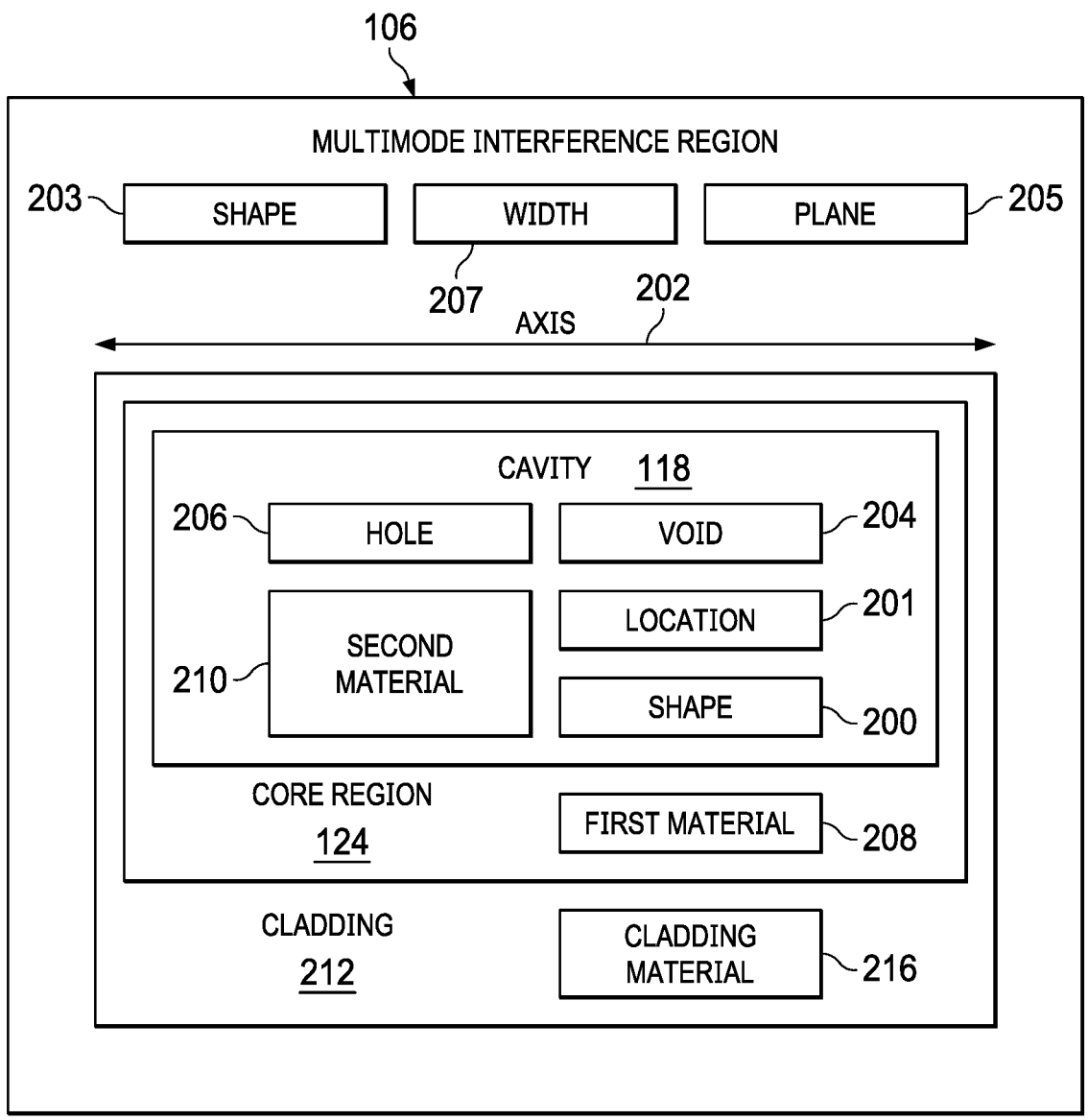
FIG. 2 is an illustration of a block diagram of the cavity in the multimode interference region in accordance with an illustrative embodiment in accordance with an illustrative embodiment.

With reference next to FIG. 2, an illustration of a block diagram of the cavity in the multimode interference region is depicted in accordance with an illustrative embodiment. In the illustrative examples, the same reference numeral may be used in more than one figure. This reuse of a reference numeral in different figures represents the same element in the different figures In this illustrative example, cavity 118 in multimode interference region 104 has shape 200 and location 201. In the illustrative example, shape 200 and location 201 can be selected to provide symmetry within multimode interference region 104. This symmetry can improve the performance in at least one of performance bandwidth or tolerance to changes in refractive index in the optical waveguides in mode conversion waveguide system 100.

Shape 200 and location 201 can be selected such that cavity 118 causes light 130 to reflect within multimode interference region 104 such that light 130 propagate in the direction of travel. For example, if light 130 is input into single mode waveguide 102, cavity 118 causes light 130 to travel away from single mode waveguide 102. As another example, if light 130 is input into multimode waveguide 106, cavity 118 causes light 130 to travel away from multimode waveguide 106. In other words, cavity 118 reduces reflections of light 130 that causes light 130 to travel in the opposite direction from which light 130 traveling one input into multimode interference region 104.

Shape 200 can take a number different forms. For example, shape 200 can be selected from one of a cylinder, an ellipsoid, a pyramid, a cone, a sphere, a frustrum, a conical frustrum, a pyramid frustrum, a geometric shape that is symmetric about plane 205 for the multimode interference region, and other suitable shapes. In this example, plane 205 is an xz plane such as xz plane 702 in FIG. 7 below.

In this illustrative example, multimode interference region 104 is symmetric about axis 202 extending centrally through the multimode interference region 104. In another example, multimode interference region 104 is symmetric about plane 205 for multimode interference region 104. For example, multimode interference region 104 can be symmetric about an xz plane bisecting base width 207 of multimode interference region 104. In one example shape 203 of multimode interference region 104 is symmetric about a plane or axis extending centrally through multimode interference region 104. In this example, location 201 of cavity 118 within multimode interference region 104 is symmetric about plane 205. Location 201 is a three-dimensional location and can be described using a Cartesian coordinate system using XYZ values. Cavity 118 can be symmetric about axis 202 extending centrally through the multimode interference region 104.

Further, cavity 118 can take a number of different forms. For example, cavity 118 can be one of void 204 or hole 206 having shape 200. Void 204 is enclosed within multimode interference region 104, a hole 206 extending into multimode interference region 104. hole 206 extends through multimode interference region 104 and is in communication with another component in mode conversion waveguide system 100 outside of multimode interference region 104.

In the illustrative example, multimode interference region 104 is comprised of first material 208 and cavity 118 is filled with second material 210 different from first material 208. In this illustrative example, second material 210 has a lower refractive index than first material 208. In one illustrative example, second material 210 can be air, silicon oxide ($SiO_2$), an insulator, or some other suitable material.

In the illustrative example, wherein the multimode interference region 104 can comprise cladding 212 and core region 214 within cladding 212. Core region is comprised of first material 208. In this example, cavity 118 is located in core region 214 in multimode interference region 104. In this example, second material 210 for cavity 118 can be the same material as cladding material 216 for cladding 212.

Figure 3:
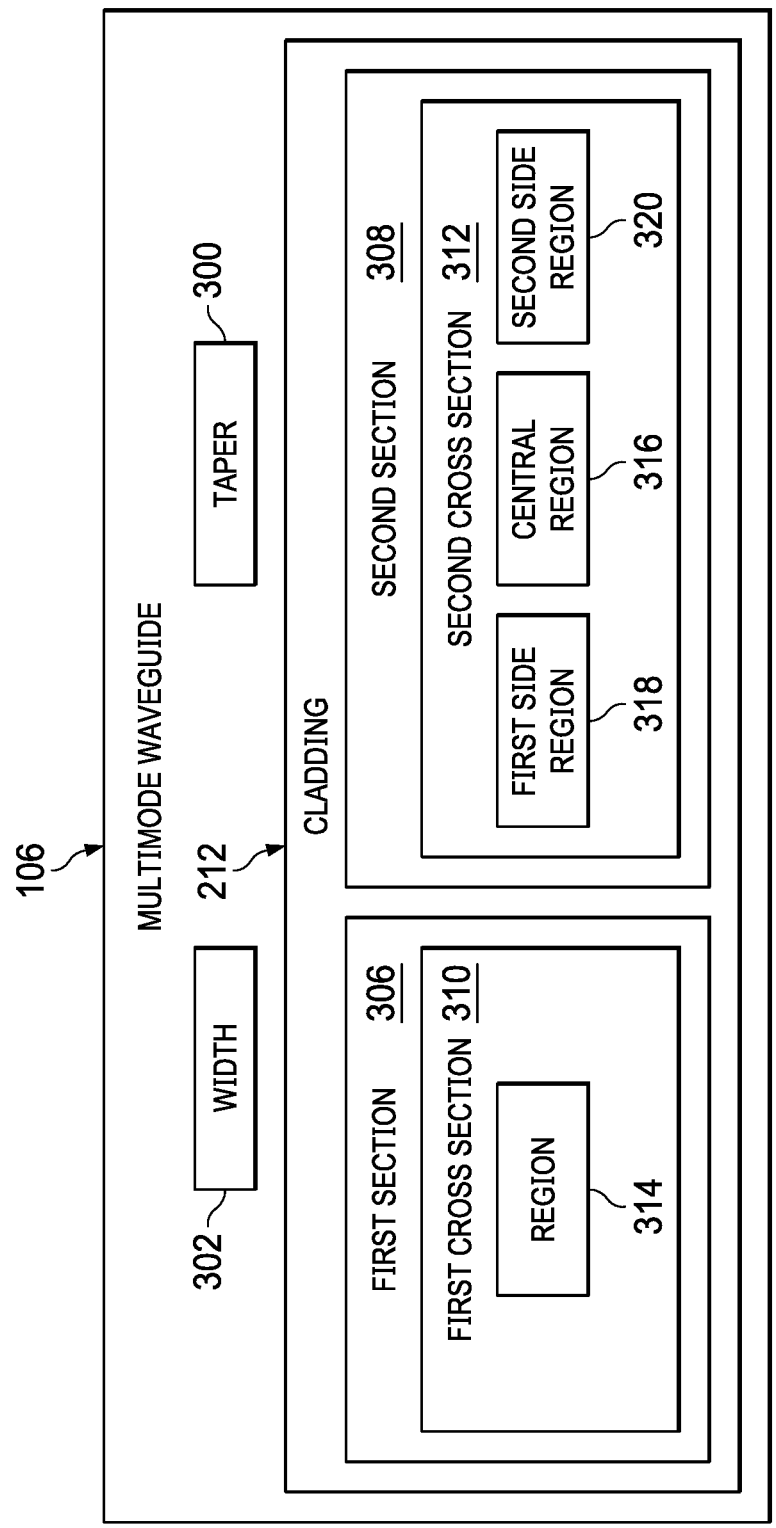
FIG. 3 is an illustration of a block diagram of the multimode waveguide in accordance with an illustrative embodiment.

Turning to FIG. 3, an illustration of a block diagram of the multimode waveguide is depicted in accordance with an illustrative embodiment. Multimode waveguide 106 can have taper 300. For example, taper 300 for multimode waveguide 106 can be such that width 302 of multimode waveguide 106 becomes smaller farther away from a connection of multimode waveguide 106 to multimode interference region 104 In other words, width 116 of multimode waveguide 106 can taper such that width 302 of multimode waveguide 106 is greater at the connection of multimode waveguide 106 to multimode interference region 104 to than width 302 of the multimode waveguide at a location away from the connection of multimode waveguide 106 to multimode interference region 104

Further, multimode waveguide 106 can comprise a first section 306 and second section 308. In this example, first section 306 is connected to multimode interference region, and a second section is connected to first section 306. In this illustrative example, first section 306 has first cross section 310, and second section 140 has second cross section 312 that is different from first cross section 142.

In one illustrative example, first cross section 310 in first section 306 can be comprised of region 314 comprised of silicon nitride. Second cross section 312 in second section 308 can be comprised of central region 316 of lithium niobate located between first side region 318 of silicon nitride and second side region 320 of silicon nitride. Central region 316 can be comprised is between first side region 318 and second side region 320. The sections can be located within cladding 212.

In the illustrative example, mode conversion waveguide system 100 provides improved performance as compared to current mode conversion waveguide systems. As depicted, light 130 can be inputs at either single mode waveguide wanted to or multimode waveguide 106. When input is in single mode waveguide 102, light 130 is in a single mode with the output being at multimode waveguide 106 being in a multimode. When input is in multimode waveguide 106, light 130 is any multimode with the output at single mode waveguide wanted to being in a single mode.

Thus, as depicted, mode conversion waveguide system 100 uses a 1×1 mode conversion system in which a single multimode waveguide, a single multimode interference region, and a single multimode waveguide is used to provide mode conversion between higher order modes and lower order modes of light 130. Mode conversion waveguide system 100 only uses one input waveguide and one output waveguide in contrast to mode conversion waveguide system 100 that use multiple input waveguides, multiple, multiple multimode interference regions, multiple output waveguides, or a combination thereof.

In the illustrative examples, mode conversion waveguide system 100 is tolerant to changes in the refractive index of the waveguides. This feature can provide a technical effect of reducing issues with using materials in the waveguides that have a refractive index are difficult to precisely control. In this example, a change in refractive index does not disturb the symmetry. As a result, changes that occur are balanced in the mode conversion waveguide system 100. The input and output modes also have symmetry, so the efficiency of the mode conversion process is not dramatically changed.

Current mode conversion systems have a lack of symmetry. As a result, a change in refractive index does not have an evenly distributed effect, resulting results in a reduction of efficiency of mode conversion. The different parts of current mode conversion systems can be altered in slightly different amounts, which disturbs the system in an undesirable way. For instance, in directional coupler mode converters, a change in refractive index of the material changes the effective refractive index of the modes in each waveguide by a different amount. This change results in the effective refractive index of the modes no longer being equal, reducing mode conversion efficiency.

The refractive index of the material throughout mode conversion system may not be precisely the value that was specified in the design. For waveguide effective refractive index, depending on geometry the change in refractive index of the material can have a larger or smaller effect on effective refractive index.

Further, with mode conversion waveguide system 100, the design is easier to manufacture as compared to current mode converters such as a directional coupler. Mode conversion waveguide system 100 can be manufactured using a minimum feature size of about 120 nm while other mode converters currently used have a minimum feature size of 37 nm. Additionally, mode conversion waveguide system 100 can be manufactured such that the coupling length is less than 10 μm while a directional coupler use mode conversion may have a coupling length of over 50 μm.

Figure 4:
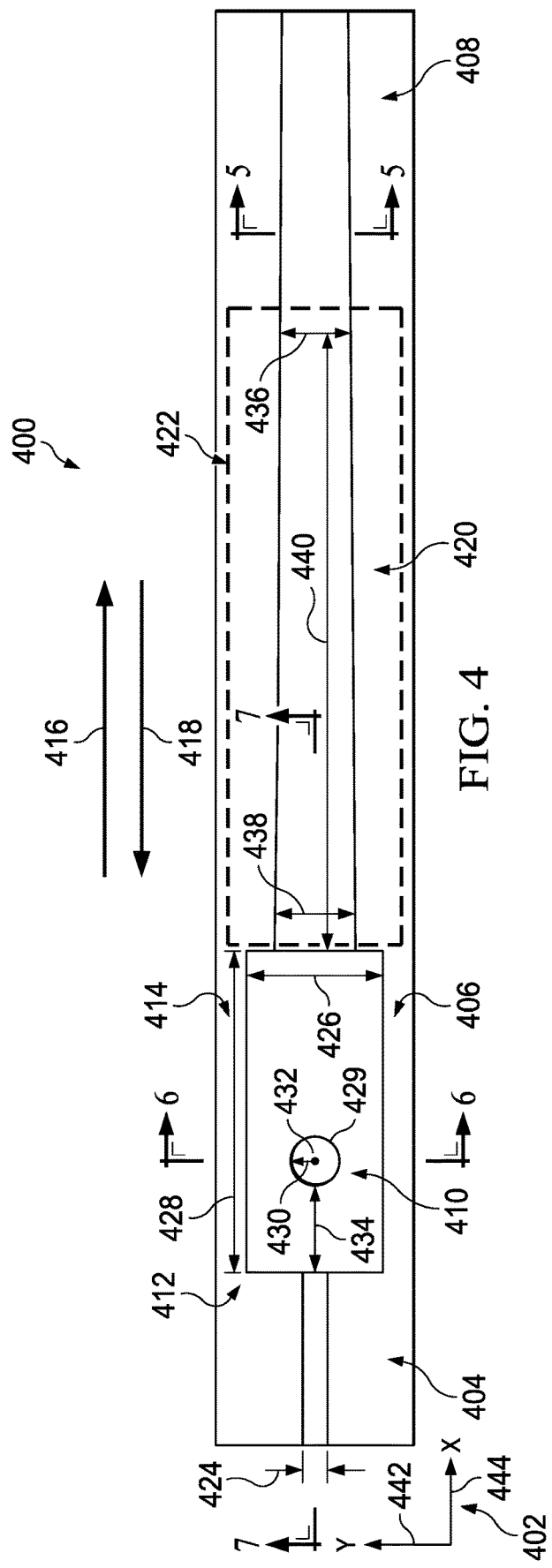
FIG. 4 is an illustration of a mode conversion waveguide system in accordance with an illustrative embodiment.

With reference now to FIG. 4, an illustration of a mode conversion waveguide system is depicted in accordance with an illustrative embodiment. As depicted, mode conversion waveguide system 400 is an example of one implementation for mode conversion waveguide system 100 shown in block form in FIG. 1. Mode conversion waveguide system 800 can be configured to perform mode conversion between $TE_{11}$ and $TE_{31}$ modes and $TM_{11}$ and $TM_{31}$ modes through the selection of dimensions for the different components in mode conversion waveguide system 400. In this illustrative example, the dimensions provided for this example implementation can be used for mode conversion perform mode conversion between $TE_{11}$ and $TE_{31}$ modes. These example dimensions can be used to convert the mode of an optical with a wavelength of 655 nm.

As depicted, mode conversion waveguide system 400 is shown in a top view on xy plane 402 defined by y-axis 442 and x-axis 444. In this illustrative example, mode conversion waveguide system 400 comprises single mode waveguide 404, multimode interference region 406, and multimode waveguide 408. In this illustrative example, multimode interference region 406 has cavity 410.

In this illustrative example, these different components are located within confinement structure 412 in the form of cladding 414. Confinement structure 412 is one or more layers of a lower refractive index as compared to the other structures to cause light to reflect internally within single mode waveguide 404, multimode interference region 406, multimode waveguide 408.

In this illustrative example, cladding 414 can be comprised of one or more materials. For example, cladding 414 can be selected from at least one of air, silicon oxide ($SiO_2$).

As depicted, cavity 410 can optionally be filled with the same materials as cladding 414. In this illustrative example, when light travels through mode conversion waveguide system 400 in direction 416, cavity 410 is configured to promote or cause the reflection of light in that direction 416 and reduce the reflection of light in direction 418. For example, cavity 410 causes light traveling within multimode interference region 406 to propagate away from single mode waveguide 404 for light traveling through single mode waveguide 404 and direction 416.

In other words, the use of cavity 410 and configuration of cavity 410 can reduce reflections of light traveling in direction 418. As result, increased efficiency or transmission of light and converting light from a fundamental mode into a higher order mode occurs in direction 416 through the use of cavity 410.

Further, light traveling in direction 418 through mode conversion waveguide system 400 can be converted from a higher order mode into a lower order mode such as a fundamental optical mode. The use of cavity 410 within multimode interference region 406 for light traveling in direction 418 can also improve the efficiency in converting light having a higher order mode when received from multimode waveguide 408 into a lower order mode that can be transmitted through single mode waveguide 404.

As depicted, multimode waveguide 408 has taper 420 in section 422 of multimode waveguide 408. Taper 420 can help reduce loss of light traveling within multimode waveguide 408. Taper 420 is an optional feature.

Dimensions for mode conversion waveguide system 400 converting between a fundamental optical mode in the form of a $TE_{11}$ and a $TE_{31}$ optical mode can take a number of different forms. In this illustrative example, single mode waveguide 404 has base width 424 of about 318 nm.

In the illustrative example, a base width is a width at the base of an optical waveguide. The base portion in optical waveguide can be slightly larger than the width at the top of the optical waveguide. For example, an optical waveguide may have a slope or curved sidewalls such that the base with is larger than the top width of the optical waveguide.

Multimode interference region 406 has base width 426 of 1.82 μm and length 428 of 4.84 μm. Cavity 410 is a cylinder 429 that has a radius 430 of 124 nm. As depicted, center 432 of cavity from the input to multimode interference region 406 by a distance 434 of 1.67 μm.

As depicted, multimode waveguide 408 has base width 436 of 933 nm. As can be seen multimode interference region 406 has first width, base width 426 that is larger than a second width, base width 436 of multimode waveguide 106.

In this illustrative example, taper 420 in multimode waveguide 408 tapers from base width 436 of 1.32 μm to base width 438 of 933 nm over distance 440 of 10 μm. In this illustrative example, the center of single mode waveguide 404, multimode interference region 406, multimode waveguide 408, and cavity 410 are aligned relative to each other with respect to y-axis 442.

In this illustrative example, the height of single mode waveguide 404, multimode interference region 406, multimode waveguide 408 in mode conversion waveguide system 400 with respect to the z-axis (not shown) is 300 nm. The z-axis is perpendicular to xy plane 402.

Figure 5:
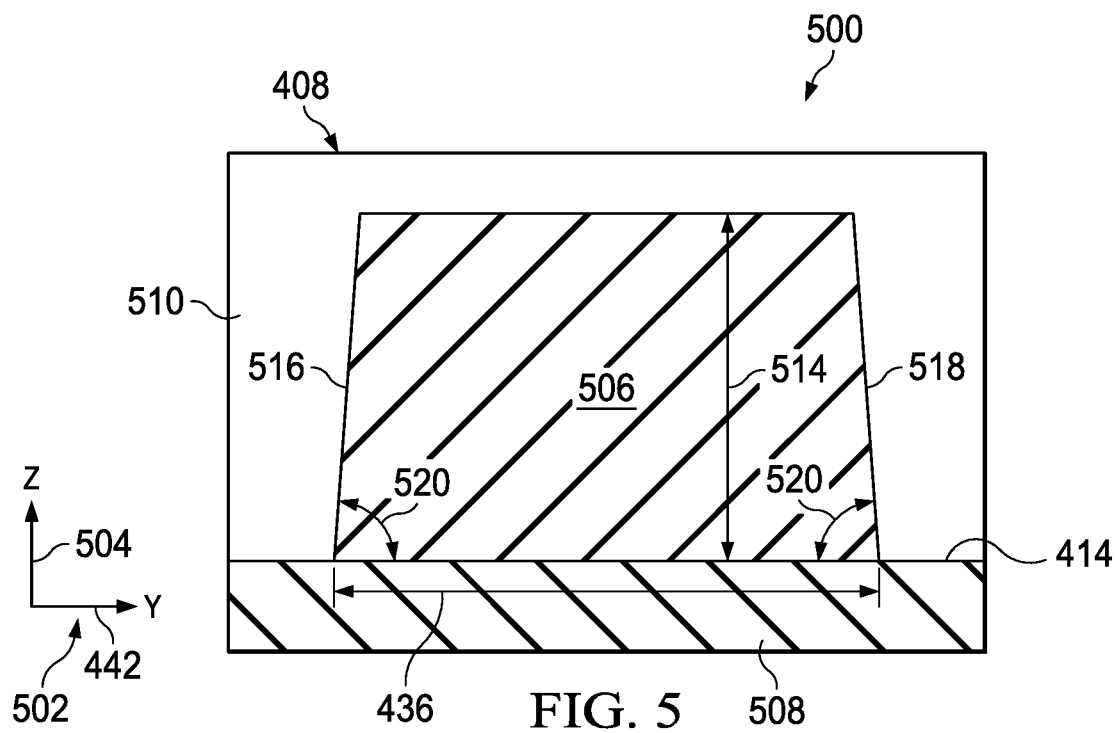
FIG. 5 is an illustration of a cross-section of a multimode waveguide in accordance with an illustrative embodiment.

Turning now to FIG. 5, an illustration of a cross-section of a multimode waveguide is depicted in accordance with an illustrative embodiment. In this illustrative example, cross-section 500 is a cross-sectional view of multimode waveguide 408 taken along lines 5-5 in FIG. 4. As depicted, cross-section 500 is on YZ plane 502 defined by y-axis 442 and z-axis 504.

In this illustrative example, multimode waveguide 408 is comprised of core region 506 and cladding 414. Core region 506 is the portion of multimode waveguide 408 which an optical signal travels in this illustrative example. In this illustrative example, core region 506 is comprised of silicon nitride (SiN).

As depicted, cladding 414 is comprised two sections, lower cladding 508 and upper cladding 510. Lower cladding 508 is comprised of a layer of silicon dioxide ($SiO_2$) and upper cladding 510 is comprised of air.

In this illustrative example, core region has base width 436 of 933 nm and height 514 of 300 nm. Sidewall 516 and sidewall 518 have slope angle 520 of 80 degrees.

Figure 6:
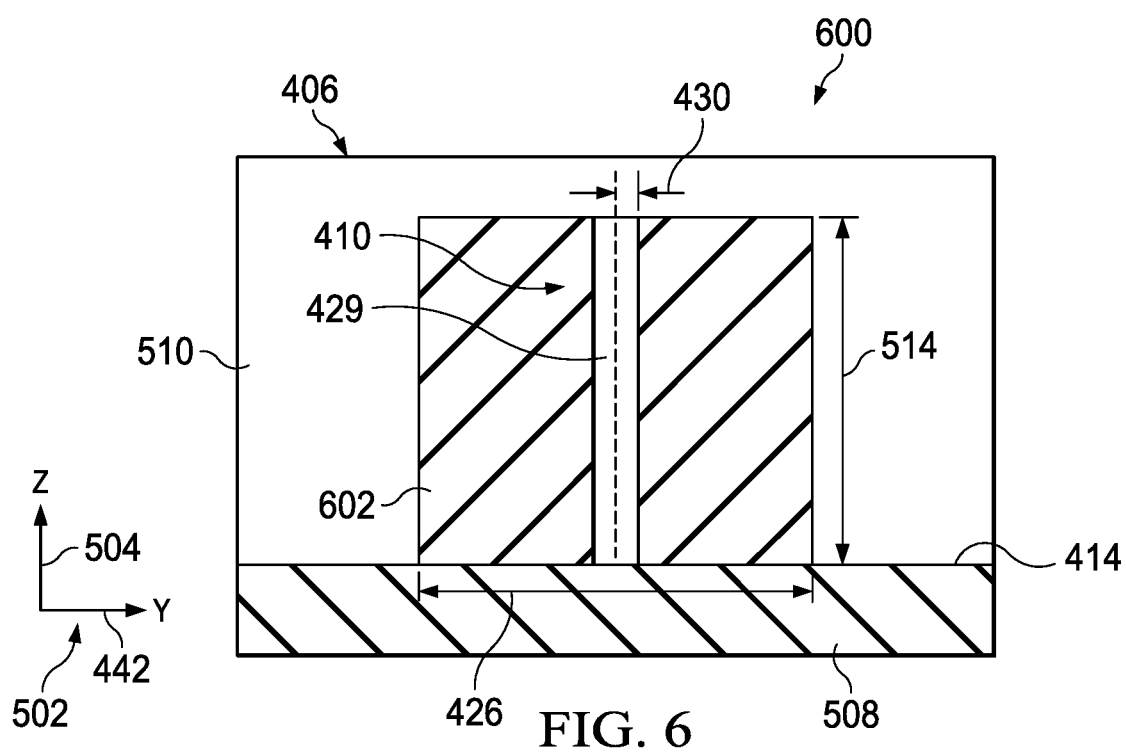
FIG. 6 is an illustration of a cross-section of a multimode interference region in accordance with an illustrative embodiment.

Turning next to FIG. 6, an illustration of a cross-section of a multimode interference region is depicted in accordance with an illustrative embodiment. In this illustrative example, cross-section 500 is a cross-sectional view of multimode waveguide 408 taken along lines 6-6 in FIG. 4. As depicted, cross-section 600 is on YZ plane 502 defined by y-axis 442 and z-axis 504.

In this illustrative example, multimode waveguide 408 is comprised of core region 602 and cladding 414. Core region 602 is the portion of multimode interference region 406 in which an optical signal travels in this illustrative example. In this illustrative example, core region 602 is comprised of silicon nitride (SiN). Core region 602 has base width 426 of 1.82 μm and height 514 of 300 nm.

As depicted, cavity 410 is in communication with upper cladding 510 and lower cladding 508 and takes the form of a cylinder 429 with height 514 that extends from upper cladding 510 comprised of air to lower cladding 508 comprised of silicon oxide ($SiO_2$). Cylinder 429 has radius 430 of 124 nm.

Figure 7:
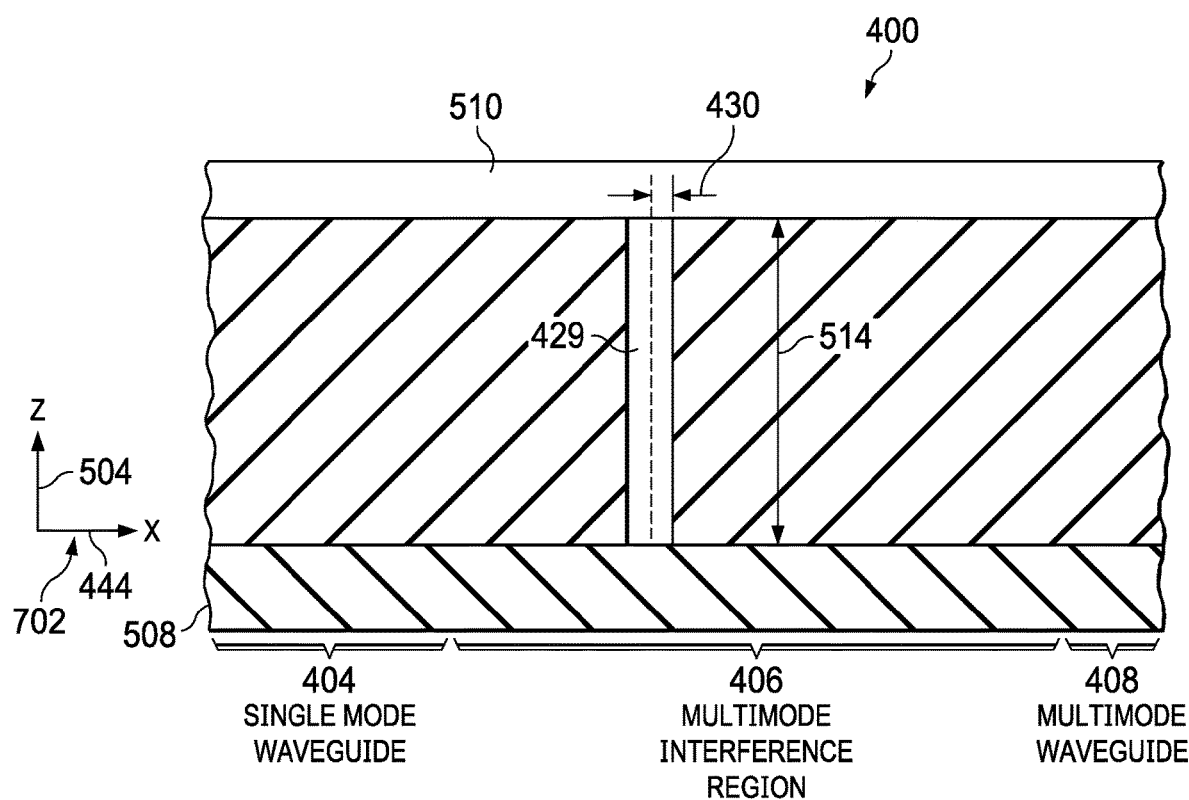
FIG. 7 is an illustration of a cross-section of a mode conversion waveguide system in accordance with an illustrative embodiment.

With reference to FIG. 7, an illustration of a cross-section of a mode conversion waveguide system is depicted in accordance with an illustrative embodiment. In this illustrative example, cross-section 700 is a cross-sectional view of a portion of mode conversion waveguide system 400 taken along lines 7-7 in FIG. 4. As depicted, cross-section 700 is on XZ plane 702 defined by x-axis 444 and z-axis 504.

As depicted, a portion of single mode waveguide 404 and multimode waveguide 408 seen on either side of multimode interference region 406 in this cross-sectional view. As depicted, cylinder 429 is shown within multimode interference region 406.

The different dimensions for mode conversion waveguide system 400 can be changed to configure mode conversion waveguide system 400 to perform other types of conversions. Further, the configuration of cylinder 429 can change. For example, cylinder 429 may not extend all the way through multimode interference region 406 in another illustrative example.

As depicted, multimode interference region 406 is symmetric about XZ plane 702. In one illustrative example, XZ plane 702 can be defined to bisect multimode interference region 406. In other words, xz plane 702 can extend through the midpoint of base width 426 for multimode interference region 406. In this illustrative example, the symmetry is the dimensions and features of multimode interference region 406. These features can include cylinder 429. In other words, cylinder 429 can be symmetrically positioned to be bisected by xz plane 702. Further, the symmetry of multimode interference region 406 can also be about an axis extending centrally through multimode interference region 406.

Figure 8:
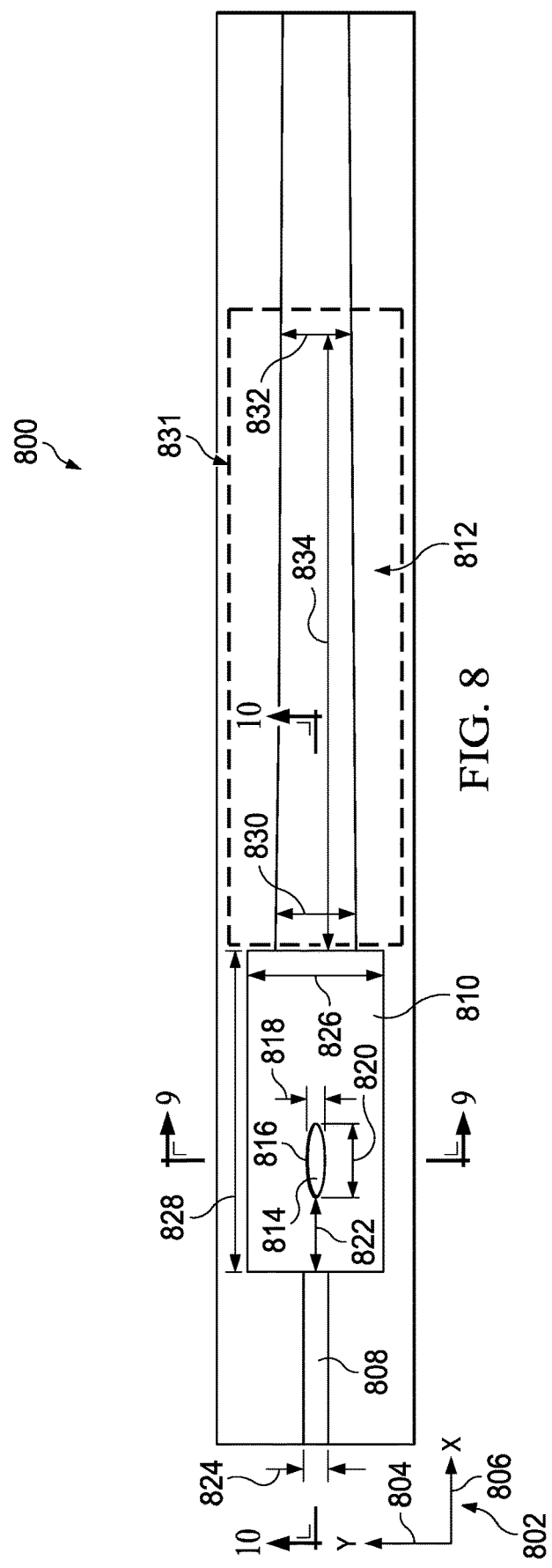
FIG. 8 is another illustration of a mode conversion waveguide system in accordance with an illustrative embodiment.

With reference now to FIG. 8, another illustration of a mode conversion waveguide system is depicted in accordance with an illustrative embodiment. As depicted, mode conversion waveguide system 800 is an example of one implementation for mode conversion waveguide system 100 shown in block form in FIG. 1. Mode conversion waveguide system 800 can be configured to perform mode conversion between $TE_{11}$ and $TE_{31}$ modes and $TM_{11}$ and $TM_{31}$ modes through the selection of dimensions for the different components in mode conversion waveguide system 800. In this example, the example dimensions can be used for mode conversions between $TM_{11}$ and $TM_{31}$ modes.

As depicted, mode conversion waveguide system 800 is shown in a top view on xy plane 802 defined by y-axis 804 and x-axis 806. In this illustrative example, mode conversion waveguide system 800 comprises single mode waveguide 808, multimode interference region 810, multimode waveguide 812. In this illustrative example, multimode interference region 810 has cavity 814 in the form of ellipsoid 816.

In this illustrative example, ellipsoid 816 has minor axis 818 of 30 nm and major axis 820 of 600 nm. As depicted, ellipsoid 816 is located distance 822 of 2.17 μm from single mode waveguide 808.

As depicted, single mode waveguide 808 has base width 824 of 318 nm. Multimode interference region 810 has base width 826 of 2.01 μm and length 828 of 6.74 μm. Multimode waveguide 812 has base width 830 of 1.32 μm that tapers to base width 830 of 1.32 μm over distance 834 of 10 μm.

In this example, the center of single mode waveguide 808, multimode interference region 810, multimode waveguide 812, and cavity 814 are aligned relative to each other with respect to y-axis 804. The height of these components is 300 nm in the direction of a z-axis in this depicted example.

Figure 9:
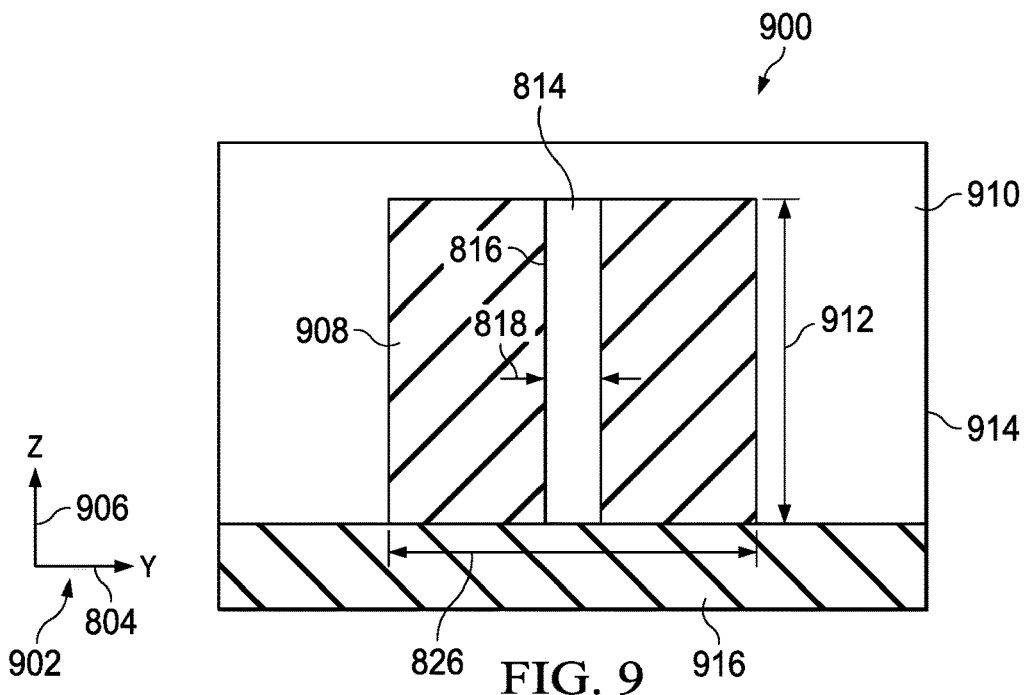
FIG. 9 is an illustration of a cross-section of a multimode interference region in accordance with an illustrative embodiment.

Turning next to FIG. 9, an illustration of a cross-section of a multimode interference region is depicted in accordance with an illustrative embodiment. In this illustrative example, cross-section 500 is a cross-sectional view of multimode waveguide 408 taken along lines 9-9 in FIG. 8. As depicted, cross-section 900 is on YZ plane 902 defined by y-axis 804 and z-axis 906.

In this illustrative example, multimode waveguide 812 is comprised of core region 908 and cladding 910. In this illustrative example, core region 908 is comprised of silicon nitride (SiN). Core region 908 has base width 826 of 2.01 μm and height 912 of 300 nm.

As depicted, cavity 814 is in communication with upper cladding 914 and lower cladding 916 and takes the form of ellipsoid 816 extends from upper cladding 914 comprised of air to lower cladding 916 comprised of silicon oxide ($SiO_2$). Ellipsoid 429 has minor axis 818 of 600 nm and height 912.

Figure 10:
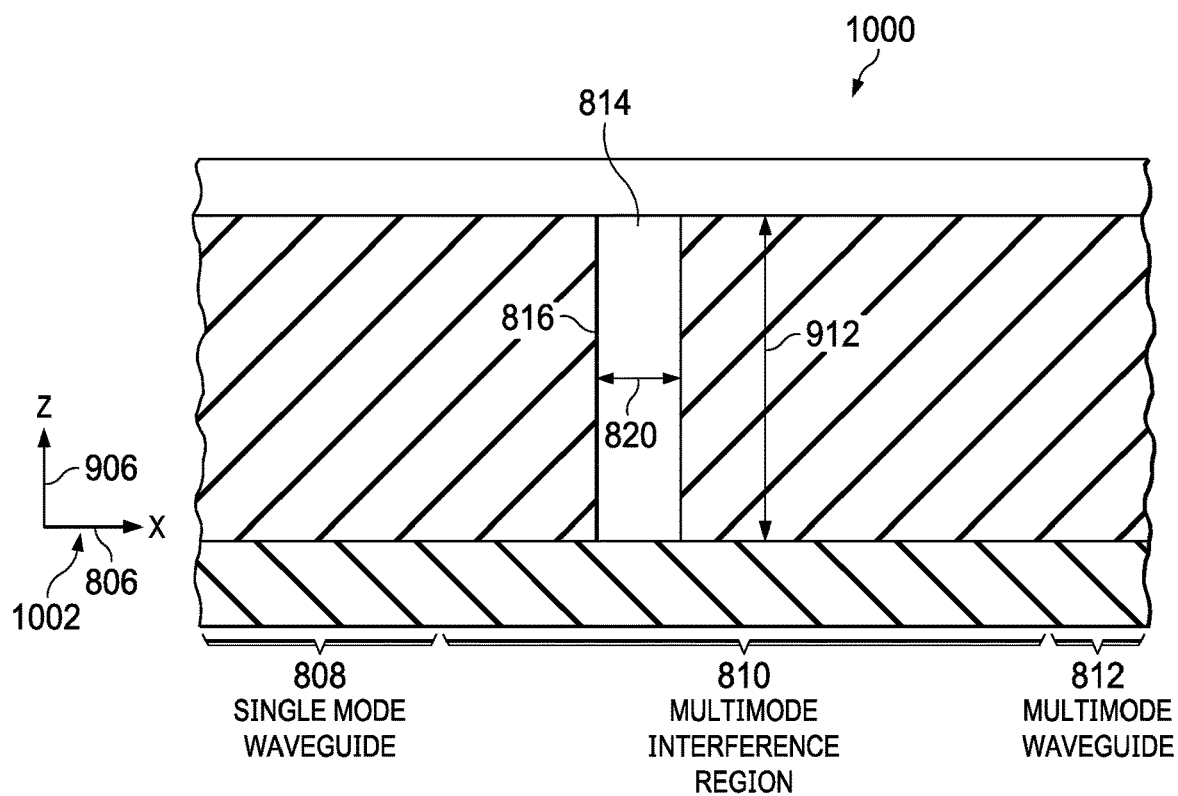
FIG. 10 is an illustration of a cross-section of a mode conversion waveguide system in accordance with an illustrative embodiment.

With reference to FIG. 10, an illustration of a cross-section of a mode conversion waveguide system is depicted in accordance with an illustrative embodiment. In this illustrative example, cross-section 1000 is a cross-sectional view of a portion of mode conversion waveguide system 800 taken along lines 10-10 in FIG. 8. As depicted, cross-section 1000 is on XZ plane 1002 defined by x-axis 806 and z-axis 906.

As depicted, a portion of single mode waveguide 808 and multimode waveguide 812 are seen on either side of multimode interference region 810 in this cross-sectional view. As depicted, ellipsoid 816 is shown within multimode interference region 810 with major axis 820 of 600 nm.

Figure 11:
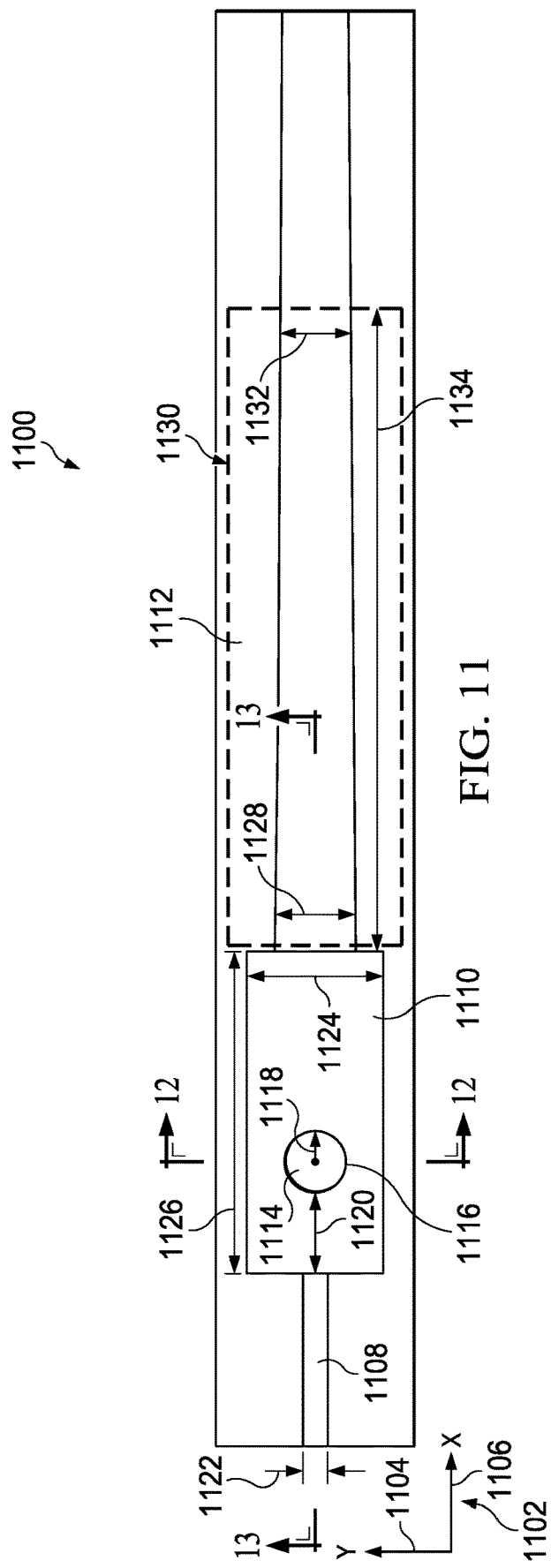
FIG. 11 is yet another illustration of a mode conversion waveguide system in accordance with an illustrative embodiment.

Turning next to FIG. 11, yet another illustration of a mode conversion waveguide system is depicted in accordance with an illustrative embodiment. As depicted, mode conversion waveguide system 1100 is an example of one implementation for mode conversion waveguide system 100 shown in block form in FIG. 1. Mode conversion waveguide system 1100 can be configured to perform mode conversion between $TE_{11}$ and $TE_{31}$ modes and $TM_{11}$ and $TM_{31}$ modes through the selection of dimensions for the different components in mode conversion waveguide system 800. In this example, the example dimensions can be used for mode conversions between $TM_{11}$ and $TM_{31}$ modes.

As depicted, mode conversion waveguide system 1100 is shown in a top view on xy plane 1102 defined by y-axis 1104 and x-axis 1106. In this illustrative example, mode conversion waveguide system 1100 comprises single mode waveguide 1108, multimode interference region 1110, multimode waveguide 1112. In this illustrative example, multimode interference region 1110 has cavity 1114 in the form of sphere 1116.

In this illustrative example, sphere 1116 has radius 1118 of 150 nm. As depicted, sphere 1116 is located distance 1120 of 2.17 μm from single mode waveguide 1108.

As depicted, single mode waveguide 1108 has base width 1122 of 318 nm. Multimode interference region 1108 has base width 1124 of 2.01 μm and length 1126 of 6.74 μm. Multimode waveguide 1112 has base width 1128 of 1.32 nm that tapers in region 1130 to base width 1132 of 0.933 μm over distance 1134 of 10 μm In this example, the center of single mode waveguide 1108, multimode interference region 1110, multimode waveguide 1112, and cavity 1114 are aligned relative to each other with respect to y-axis 1104. The height of these components is 300 nm in the direction of a z-axis in this depicted example.

Figure 12:
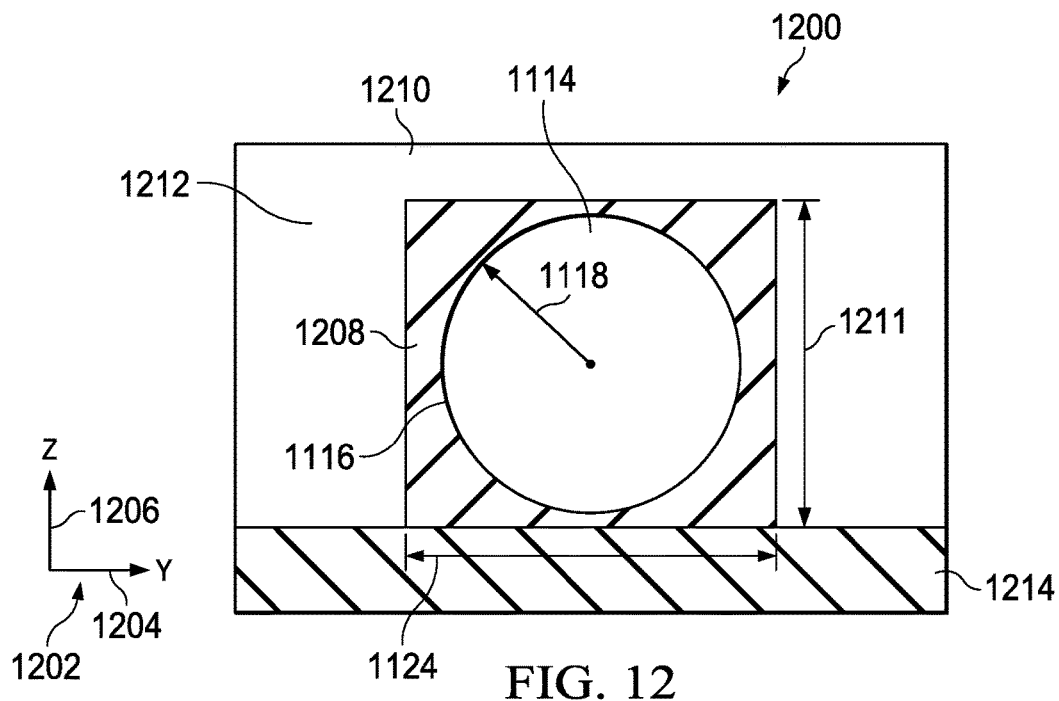
FIG. 12 is an illustration of a cross-section of a multimode interference region in accordance with an illustrative embodiment.

Turning next to FIG. 12, an illustration of a cross-section of a multimode interference region is depicted in accordance with an illustrative embodiment. In this illustrative example, cross-section 1200 is a cross-sectional view of multimode waveguide 408 taken along lines 12-12 in FIG. 11. As depicted, cross-section 1200 is on YZ plane 1202 defined by y-axis 1204 and z-axis 1206.

In this illustrative example, multimode waveguide 1112 is comprised of core region 1208 and cladding 1210. In this illustrative example, core region 1208 is comprised of silicon nitride (SiN). Core region 1208 has base width 1124 of 2.01 μm and height 1211 of 300 nm.

Cladding 1210 is comprised of upper cladding 1212 and lower cladding 1214. In this illustrative example, upper cladding 1212 is comprised of air, and lower cladding 1214 is comprised of silicon oxide ($SiO_2$).

As depicted, cavity 1114 is sphere 1116 located within core region 1208 and is not in communication with upper cladding 1212 and lower cladding 1214. As depicted, sphere 1116 has radius 1118 of 150 nm in this example.

Figure 13:
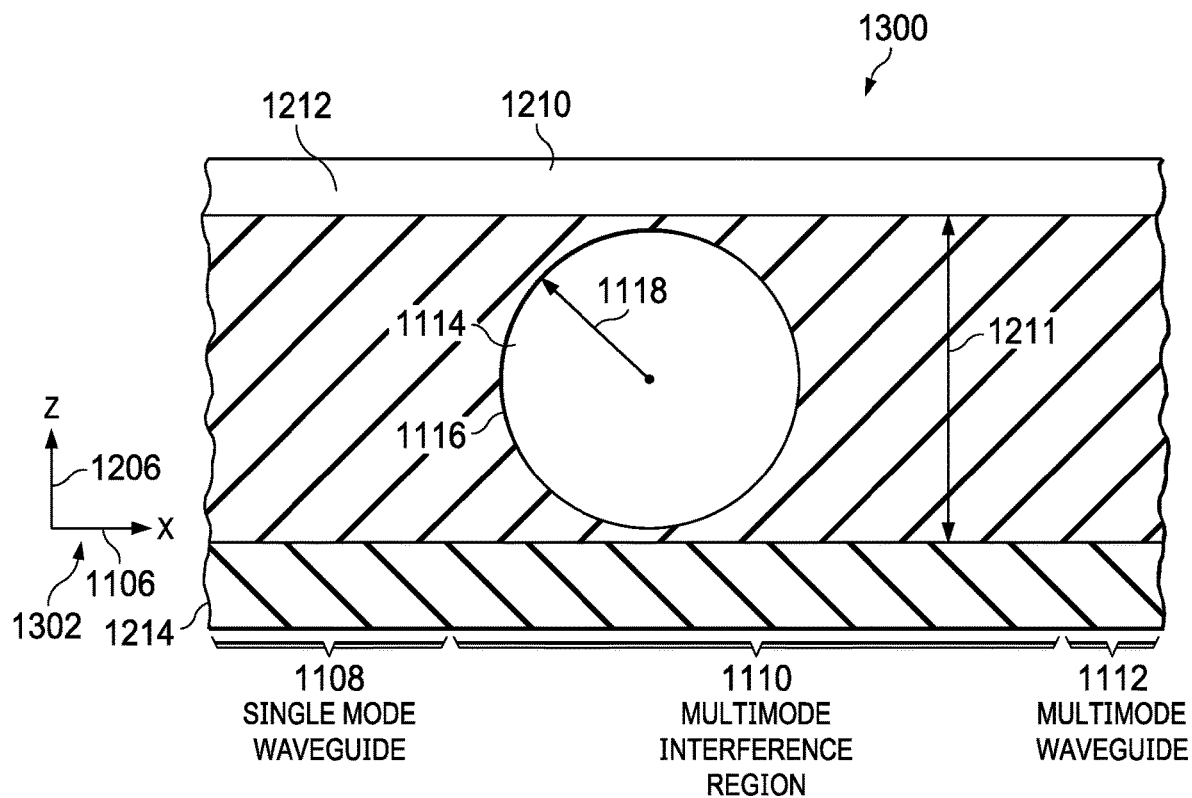
FIG. 13 is an illustration of a cross-section of a mode conversion waveguide system in accordance with an illustrative embodiment.

With reference to FIG. 13, an illustration of a cross-section of a mode conversion waveguide system is depicted in accordance with an illustrative embodiment. In this illustrative example, cross-section 1300 is a cross-sectional view of a portion of mode conversion waveguide system 800 taken along lines 13-13 in FIG. 11. As depicted, cross-section 1000 is on XZ plane 1302 defined by x-axis 1106 and z-axis 1206.

As depicted, a portion of single mode waveguide 1108 and multimode waveguide 1112 are seen on either side of multimode interference region 1110 in this cross-sectional view. As depicted, cavity 1114 in the form of sphere 1116 is shown within multimode interference region 1110 with radius 1118 of 150 nm.

Illustration of the mode conversion waveguide systems in FIGS. 4-13 are provided as examples of implementations for mode conversion waveguide system 100 shown in block form FIGS. 1-3. The different dimensions and configurations described are provided as examples are not meant to limit the manner in which other illustrative examples can be implemented. For example, different components have asymmetry that contribute to increase bandwidth and tolerance to changes in a refractive index. In the illustrative examples, the increase bandwidth results from increasing coupling efficiency when changing the mode of the input optical signal.

In these examples the symmetry for the cavities are described as being aligned with the other components relative to a y-axis. In other words, the cavities are described as being aligned with respect to an axis extending through the different components.

Yet other examples, different dimensions to be used to obtain desired mode conversions between TE or TM modes. In yet other illustrative examples, tapers can be absent from the multimode waveguides depicted in these figures.

As yet another example, the different waveguides in the mode conversion waveguide system can be composed of different materials. For example, the single mode waveguide maybe comprising one material, the multimode interference region can be comprised of a second material, and the multimode waveguide comprised of third material.

As another illustrative example, other types of materials and combinations materials can be used for the cladding other than an upper cladding is air and a lower cladding of silicon oxide in which the optical waveguide is comprised of silicon nitride. These examples are not meant to exclude using other materials For example, silicon, silicon carbide, lithium niobate, or other materials may be used for the cores. In other illustrative examples, the upper cladding may be comprised of the materials other than air. For example, silicon oxide, or other materials with a desired refractive level can be used in addition to or in place of air. The refractive index of the material that guides the optical modes can affect the selection of the optimal geometry of the waveguides and dimensions in components such as a multimode interference region.

Figure 14:
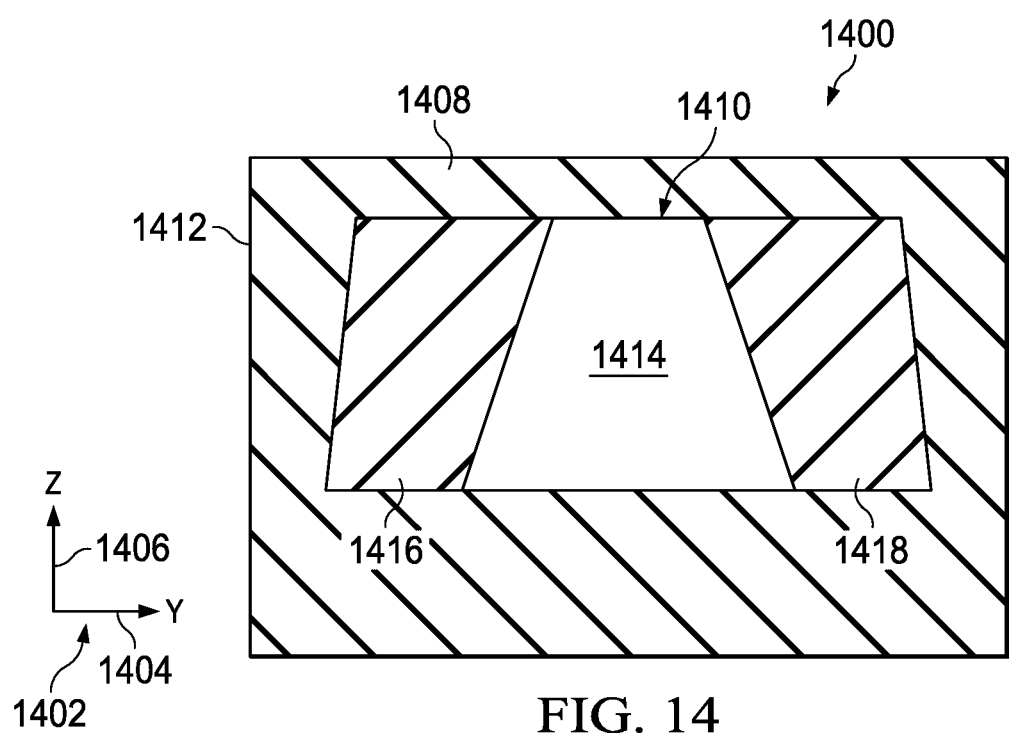
FIG. 14 is an illustration of a cross-sectional view of a multimode waveguide in accordance with an illustrative embodiment.

For example, in FIG. 14 a cross-sectional view of a multimode waveguide is depicted in accordance with an illustrative embodiment. In this figure, the multimode waveguide uses a different type of material from the examples in FIGS. 4-13. As depicted, cross-section 1400 is on YZ plane 1402 defined by y-axis 1404 and z-axis 1406. This example of multimode waveguide 1408 is another example configuration for a multimode waveguide that can be used in addition to or in place of the configuration shown for multimode waveguide 408 in cross-sectional 500 in FIG. 5.

In this illustrative example, multimode waveguide 1408 is comprised of core region 1410 and cladding 1412. In this illustrative example, core region 1410 is comprised central region 1414, first side region 1416, and second side region 1418. Central region 1414 is located between first side region 1416 and second side region 1418. As depicted, central region 1414 is comprised of lithium niobate ($LiNbO_3$) while first side region 1416 and second side region 1418 are comprised of silicon nitride (SiN). In this example, cladding 1412 is comprised of silicon oxide ($SiO_2$).

Figure 15:
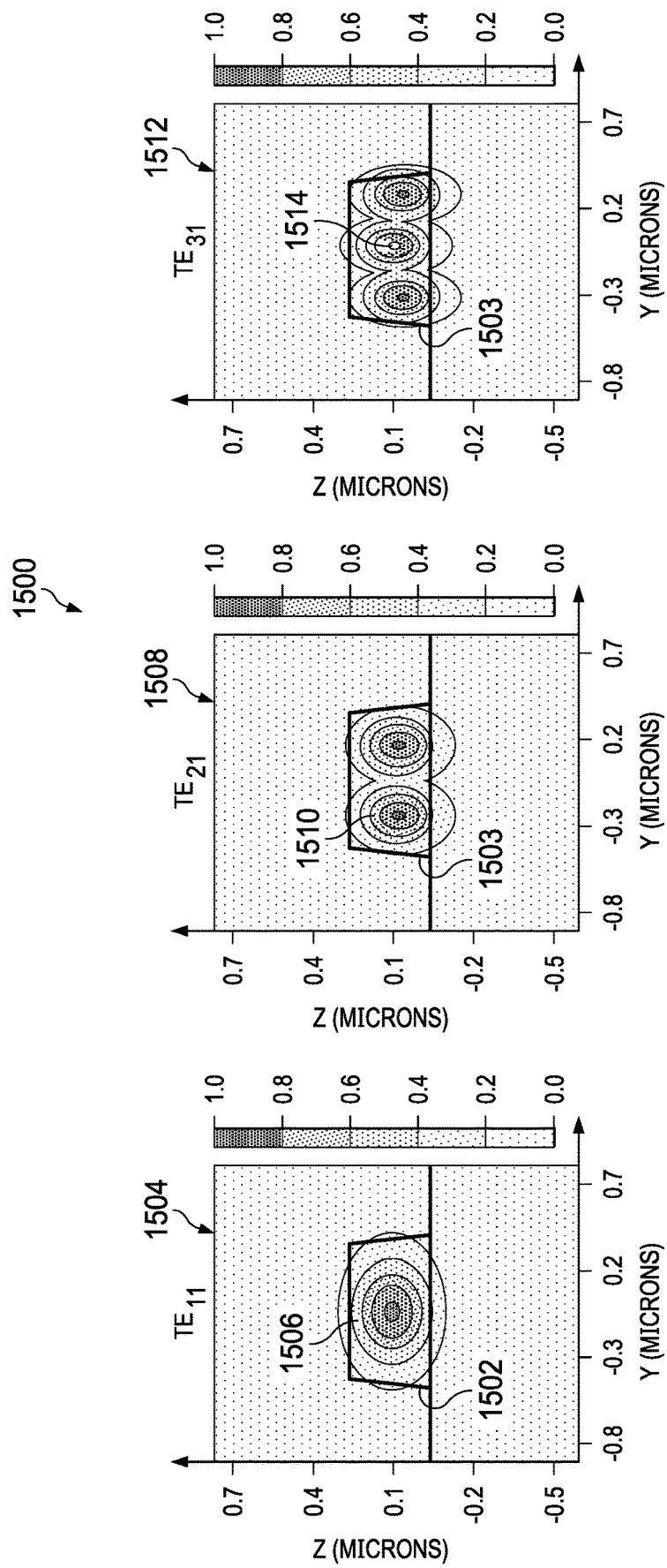
FIG. 15 is an illustration of transverse electric modes that can be present in a mode conversion waveguide system is depicted in accordance with an illustrative embodiment.

With reference to FIG. 15, an illustration of transverse electric modes that can be present in a mode conversion waveguide system is depicted in accordance with an illustrative embodiment. Graphs 1500 depicted different trends verse electric modes that can be present in a mode conversion waveguide system such as mode conversion waveguide system 100 in FIG. 1, mode conversion waveguide system 400 in FIG. 4, mode conversion waveguide system 800 in FIG. 8, and mode conversion waveguide system 1100 in FIG. 11.

Graphs 1500 show electric field intensities for particular optical modes in waveguide 1502 comprised of silicon nitride. These modes are named according to the convention that $TE_{ij}$ describes a TE mode with i electric field peaks in the y direction on the x-axes and j electric field peaks in the z direction on the y-axes.

As depicted, graph 1504 shows $TE_{11}$ mode 1506 relative to waveguide 1502, such as a single mode waveguide. $TE_{11}$ mode 1506 is a fundamental mode in this example and has a single lobe.

Graph 1508 depicts $TE_{21}$ mode 1510 relative to waveguide 1503, such as a multimode mode waveguide. $TE_{21}$ mode 1506 has two lobes. In this illustrative example, graph 1512 depicts $TE_{31}$ mode 1515 relative to waveguide 1503, such as a multimode mode waveguide. $TE_{31}$ mode 1506 has three lobes. The modes in graph 1508 and graph 1512 are examples of modes that can be found in a multimode waveguide.

Figure 16:
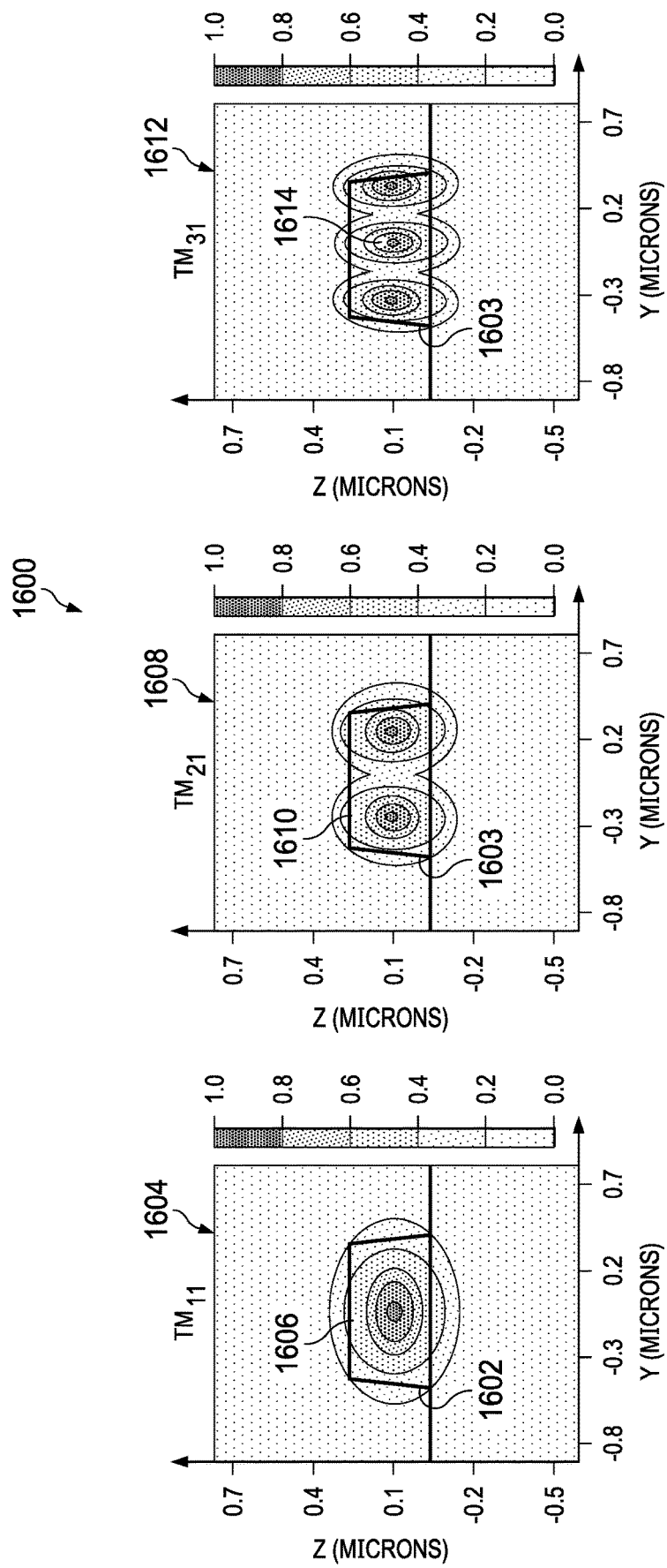
FIG. 16 is an illustration of a transverse magnetic modes that can be present in a mode conversion waveguide system in accordance with an illustrative embodiment.

Turning to FIG. 16, an illustration of a transverse magnetic modes that can be present in a mode conversion waveguide system is depicted in accordance with an illustrative embodiment. Graphs 1600 depicted different transverse magnetic modes that can be present in a mode conversion waveguide system such as mode conversion waveguide system 100 in FIG. 1, mode conversion waveguide system 400 in FIG. 4, mode conversion waveguide system 800 in FIG. 8, and mode conversion waveguide system 1100 in FIG. 11.

Graphs 1600 show magnetic field intensities for particular optical modes in waveguide 1502 comprised of silicon nitride. These modes are named according to the convention that $TM_{ij}$ describes a TM mode with i electric field peaks in the y direction on the on the x-axes and j electric field peaks in the z direction on the on the y-axes for a waveguide.

As depicted, graph 1604 shows $TM_{11}$ mode 1606 relative to waveguide 1602, such as a single mode waveguide. $TM_{11}$ mode 1606 is a fundamental mode in this example and has a single lobe.

Graph 1608 depicts $TM_{21}$ mode 1610 relative to waveguide 1603, such as a multimode mode waveguide. $TE_{21}$ mode 1606 has two lobes. In this illustrative example, graph 1612 depicts $TM_{31}$ mode 1614 relative to waveguide 1603, such as a multimode mode waveguide. $TM_{31}$ mode 1606 has three lobes. The modes in graph 1608 and graph 1612 are examples of modes that can be found in a multimode waveguide.

Turning to FIG. 17, an illustration of a graph depicting an electric field profile is depicted in accordance with an illustrative embodiment. In this illustrative example, graph 1700 shows the electric field profile for an optical signal input into a single mode waveguide in a mode conversion waveguide system. $TM_{ij}$ describes a TM mode with i electric field peaks in the y direction on the on the y-axes and j electric field peaks in the x direction on the on the x-axes for a waveguide.

In this illustrative example, a light signal propagates from left to right in graph 1700. This propagation results in a conversion of light signal from $TM_{11}$ to $TM_{31}$. In this illustrative example, the conversion efficiency is about 90 percent with a total optical loss of about 7 percent.

With reference next to FIG. 18, another illustration of a graph depicting an electric field profile is depicted in accordance with an illustrative embodiment. In this illustrative example, graph 1800 shows the electric field profile for an optical signal input into a multimode waveguide in a mode conversion waveguide system. The optical signal has a wavelength of 655 nm in this example. $TM_{ij}$ describes a TM mode with i electric field peaks in the y direction on the on the y-axes and j electric field peaks in the x direction on the on the x-axes for a waveguide.

In this illustrative example, light signal propagates from right to left in graph 1800. The optical signal has a wavelength of 655 nm in this example. This propagation results in a conversion of light signal from $TM_{11}$ to $TM_{31}$. In this illustrative example, the conversion efficiency is about 98 percent with a total optical loss of about 14 percent.

The illustration of electric field profiles for a mode conversion optical waveguide system in FIGS. 15-18 are depicted to show the modes for optical fields that can occur using a mode conversion waveguide system as depicted in the illustrative of examples. The intensities and types of mode conversions that occur can vary depending on the configuration of a particular mode conversion waveguide system in an illustrative example. For example, some mode conversion waveguide systems may use different materials.

Figure 19:
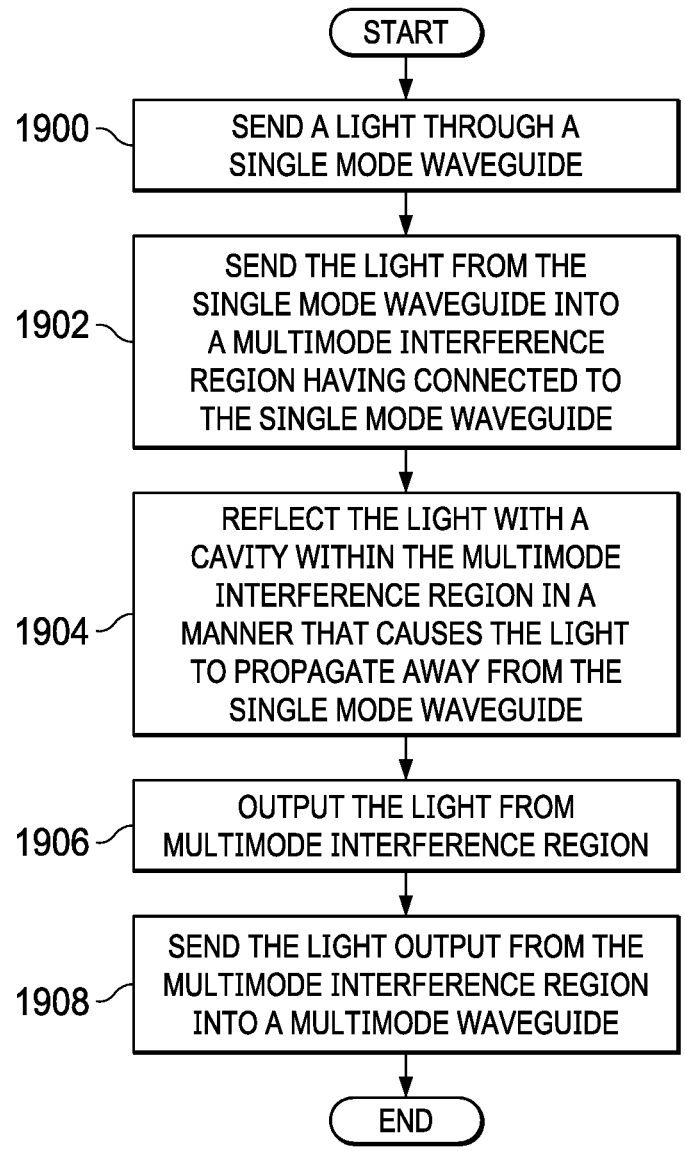
FIG. 19 is an illustration of a flowchart of a process for converting a mode of a light in accordance with an illustrative embodiment.

Turning next to FIG. 19, an illustration of a flowchart of a process for converting a mode of a light is depicted in accordance with an illustrative embodiment. The process in FIG. 19 can be implemented using mode conversion waveguide system 100 in FIG. 1.

The process begins by sending a light through a single mode waveguide (operation 1900). In operation 1900, the light has a first mode while traveling through single mode waveguide. The process sends the light from the single mode waveguide into a multimode interference region connected to the single mode waveguide (operation 1902).

The process reflects the light with a cavity within the multimode interference region in a manner that causes the light to propagate away from the single mode waveguide (operation 1904). The process outputs the light from multimode interference region (operation 1906).

The process sends the light output from the multimode interference region into a multimode waveguide (operation 1908). The process terminates thereafter.

Figure 20:
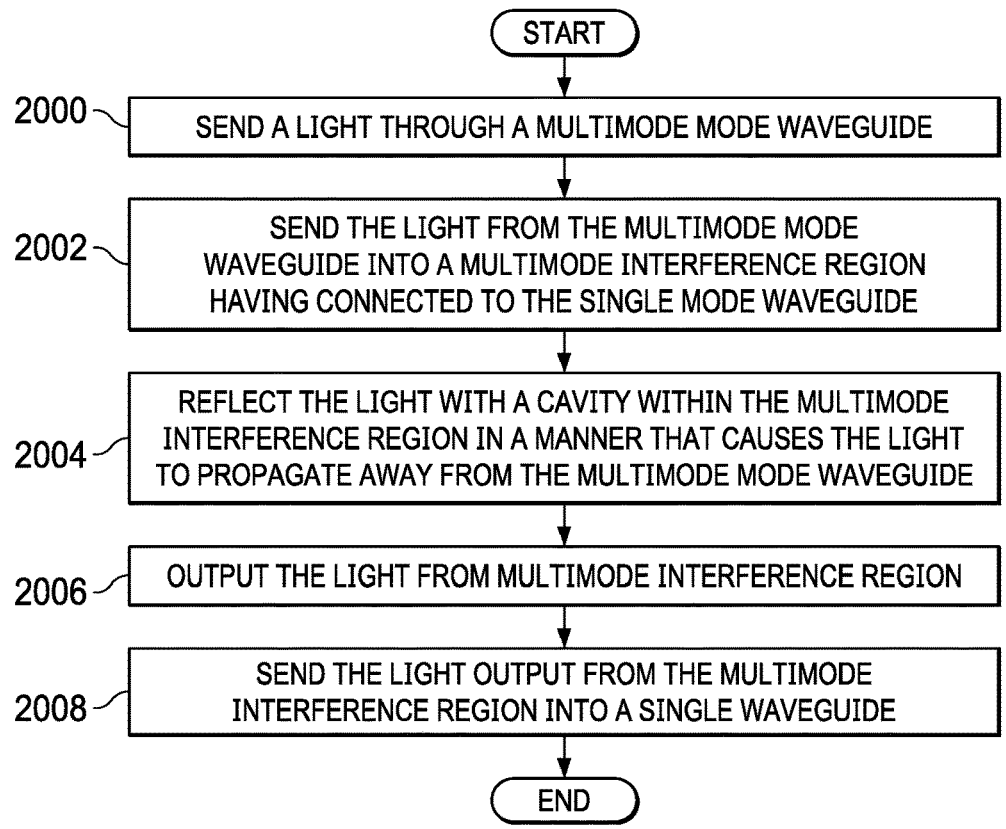
FIG. 20 is an illustration of a flowchart of a process for converting a mode of a light in accordance with an illustrative embodiment.

With reference to FIG. 20, an illustration of a flowchart of a process for converting a mode of a light is depicted in accordance with an illustrative embodiment. The process in FIG. 20 can be implemented using mode conversion waveguide system 100 in FIG. 1.

The process begins by sending a light through a multimode mode waveguide (operation 2000). In operation F300, the light has a second mode while traveling through single mode waveguide. The process sends the light from the multimode mode waveguide into a multimode interference region having connected to the single mode waveguide (operation 2002).

The process reflects the light with a cavity within the multimode interference region in a manner that causes the light to propagate away from the multimode mode waveguide (operation 2004). The process outputs the light from multimode interference region (operation 2006). In operation 2006, the light has a first mode.

The process sends the light output from the multimode interference region into a single waveguide (operation 2008). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 21:
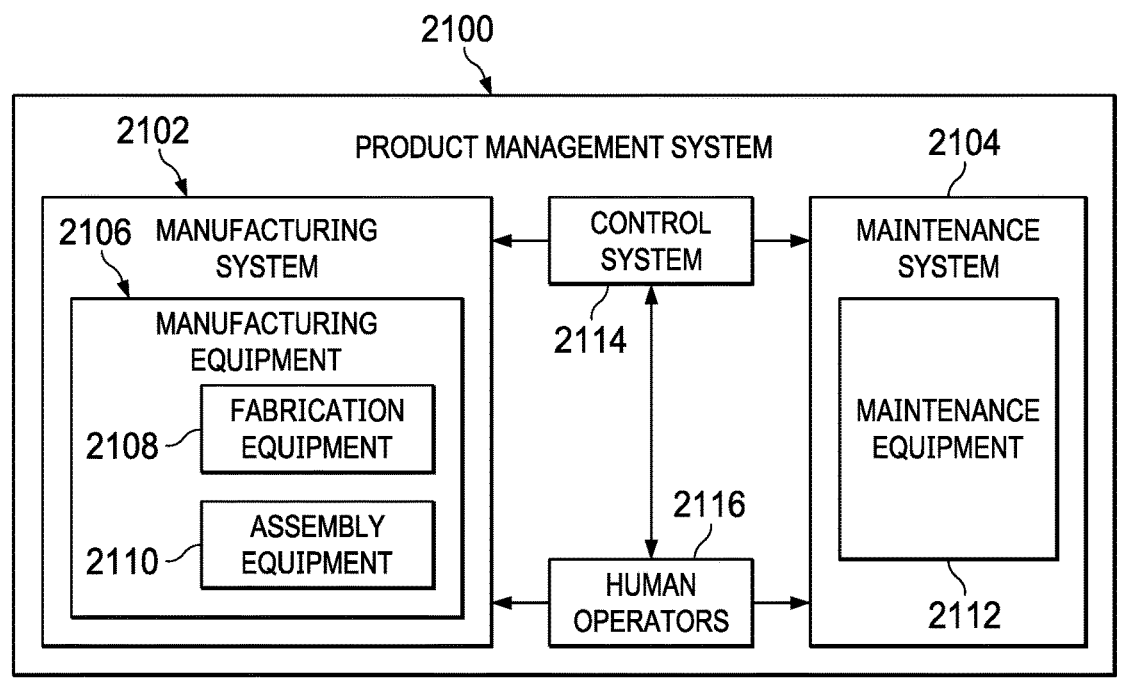
FIG. 21 is an illustration of a block diagram of a product management system is depicted in accordance with an illustrative embodiment.

Turning now to FIG. 21, an illustration of a block diagram of a product management system is depicted in accordance with an illustrative embodiment. Product management system 2100 is a physical hardware system. In this illustrative example, product management system 2100 includes at least one of manufacturing system 2102 or maintenance system 2104.

Manufacturing system 2102 is configured to manufacture products, such as aircraft A200 in FIG. A2. As depicted, manufacturing system 2102 includes manufacturing equipment 2106. Manufacturing equipment 2106 includes at least one of fabrication equipment 2108 or assembly equipment 2110.

Fabrication equipment 2708 is equipment that used to fabricate the nonlinear optical waveguide structure. Multiple copies or multiple versions of nonlinear optical waveguide structures can be fabricated on a substrate wafer.

The substrate wafer can comprise a material such as silicon, lithium niobate, quartz, sapphire, silicon carbide, or some other suitable substrate. Fabrication equipment 2708 can be used to fabricate at least one of optical waveguide structures, nonlinear optical waveguides, optical couplers, optical waveguide segments, laser transmitters, ultraviolet transmission systems, point-to-point communication devices, laser infrared countermeasure sources, through water optical communication devices, or other suitable devices, antennas, or other suitable types of parts. For example, fabrication equipment 2708 can include machines and tools.

With respect to fabricating semiconductor components and optical waveguide components, fabrication equipment 2708 can comprise at least one of an epitaxial reactor, an oxidation system, a diffusion system, an etching system, a cleaning system, a bonding machine, a dicing machine, a wafer saw, an ion implantation system, a physical vapor deposition system, a chemical vapor deposition system, a photolithography system, an electron-beam lithography system, a plasma etcher, a die attachment machine, a wire bonder, a die overcoat system, molding equipment, a hermetic sealer, an electrical tester, a burn-in oven, a retention bake oven, a UV erase system, or other suitable types of equipment that can be used to manufacture semiconductor structures.

Assembly equipment 2710 is equipment used to assemble parts to form a product such as a chip, an integrated circuit, a multi-chip module, a computer, a signal processor, an aircraft, or some other product. Assembly equipment 2710 also can include machines and tools. These machines and tools may be at least one of a robotic arm, a spinner system, a sprayer system, and elevator system, a rail-based system, or a robot.

In this illustrative example, maintenance system 2104 includes maintenance equipment 2112. Maintenance equipment 2112 can include any equipment needed to perform maintenance on aircraft A200 in FIG. A2. Maintenance equipment 2112 may include tools for performing different operations on parts on a product. These operations can include at least one of disassembling parts, refurbishing parts, inspecting parts, reworking parts, manufacturing replacement parts, or other operations for performing maintenance on the product. These operations can be for routine maintenance, inspections, upgrades, refurbishment, or other types of maintenance operations.

In the illustrative example, maintenance equipment 2112 may include ultrasonic inspection devices, x-ray imaging systems, vision systems, crawlers, and other suitable devices. In some cases, maintenance equipment 2112 can include fabrication equipment 2108, assembly equipment 2110, or both to produce and assemble parts that needed for maintenance.

Product management system 2100 also includes control system 2114. Control system 2114 is a hardware system and may also include software or other types of components. Control system 2114 is configured to control the operation of at least one of manufacturing system 2102 or maintenance system 2104. In particular, control system 2114 can control the operation of at least one of fabrication equipment 2108, assembly equipment 2110, or maintenance equipment 2112.

The hardware in control system 2114 can be implemented using hardware that may include computers, circuits, networks, and other types of equipment. The control may take the form of direct control of manufacturing equipment 2106.

For example, robots, computer-controlled machines, and other equipment can be controlled by control system 2114. In other illustrative examples, control system 2114 can manage operations performed by human operators 2116 in manufacturing or performing maintenance on products. For example, control system 2114 can assign tasks, provide instructions, display models, or perform other operations to manage operations performed by human operators 2116. In these illustrative examples, control system 2114 can manage at least one of the manufacturing or maintenance of products or components for products. The hardware in control system 2714 can be implemented using hardware that may include computers, circuits, networks, and other types of equipment.

The control may take the form of direct control of manufacturing equipment 2706. For example, robots, computer-controlled machines, and other equipment can be controlled by control system 2714. In other illustrative examples, control system 2714 can manage operations performed by human operators 2716 in manufacturing or performing maintenance on a product.

For example, control system 2714 can assign tasks, provide instructions, display models, or perform other operations to manage operations performed by human operators 2716. In these illustrative examples, the different processes for fabricating semiconductor structures, optical structures, nonlinear optical waveguides, laser transmitters, photon generators, photon transmitters, photon detectors, ultraviolet transmission systems, point-to-point communication devices, laser infrared countermeasure sources, through water optical communication devices, or other suitable devices can be manufactured using processes implemented in control system 2714.

In the different illustrative examples, human operators 2116 can operate or interact with at least one of manufacturing equipment 2106, maintenance equipment 2112, or control system 2114. This interaction can occur to manufacture products in product management system 2100.

Of course, product management system 2100 may be configured to manage other products in many different industries. For example, product management system 2100 can be used manufacture products for the aerospace industry, communications industry, space exploration industry, and other industries.

Some features of the illustrative examples are described in the following clauses. These clauses are examples of features not intended to limit other illustrative examples.

Clause 1

A mode conversion waveguide system comprising:
 a single mode waveguide;
 a multimode waveguide;
 a multimode interference region connected to the single mode waveguide and the multimode waveguide; and
 a cavity in the multimode interference region.

Clause 2

The mode conversion waveguide system according to clause 1, wherein the cavity causes a light having a first mode traveling into the multimode interference region to reflect within the multimode interference region in a manner that causes the light to have a second mode.

Clause 3

The mode conversion waveguide system according to one of clauses 1 or 2, wherein the multimode interference region has a shape that is symmetric about an axis extending centrally through the multimode interference region.

Clause 4

The mode conversion waveguide system according to one of clauses 1, 2, or 3, wherein the cavity is symmetric about an axis extending centrally through the multimode interference region.

Clause 5

The mode conversion waveguide system according to one of clauses 1, 2, 3, or 4, wherein the cavity is one of a void enclosed within the multimode interference region, a hole extending into the multimode interference region, and the hole extending through the multimode interference region.

Clause 6

The mode conversion waveguide system according to one of clauses 1, 2, 3, 4, or 5, wherein the multimode interference region is comprised of a first material and the cavity is filled with a second material different from the first material.

Clause 7

The mode conversion waveguide system according to one of clauses 1, 2, 3, 4, 5, or 6, wherein the multimode interference region comprises a cladding and a core region within the cladding, wherein the cavity is located in the core region in the multimode interference region and is filled with a cladding material for the cladding.

Clause 8

The mode conversion waveguide system according to one of clauses 1, 2, 3, 4, 5, 6, or 7, wherein the multimode interference region has a first width that is larger than a second width of the multimode waveguide.

Clause 9

The mode conversion waveguide system according to one of clauses 1, 2, 3, 4, 5, 6, 7, or 8, wherein the multimode waveguide tapers such that a width of the multimode waveguide is greater at a connection of the multimode waveguide to the multimode interference region to than the width of the multimode waveguide at a location away from the connection of the multimode waveguide to the multimode interference region.

Clause 10

The mode conversion waveguide system according to one of clauses 1, 2, 3, 4, 5, 6, 7, 8, or 9, wherein the multimode waveguide comprises:
  a first section connected to the multimode interference region; and
  a second section connected to first section, wherein the first section has a first cross section and the second section has a second cross section that is different from the first cross section.

Clause 11

The mode conversion waveguide system according to clause 10, wherein the first cross section is comprised of silicon nitride and the second cross section is comprised of central region of lithium niobate located between a first side region of silicon nitride and a second side region of the silicon nitride.

Clause 12

The mode conversion waveguide system according to one of clauses 1, 2, 3, 4, 5, 6, 7, 8, 9, or 10, wherein a light having a first mode travels through the single mode waveguide and is input into the multimode interference region and is output from the multimode interference region into the multimode waveguide with a second mode.

Clause 13

The mode conversion waveguide system according to clause 12, wherein the first mode is $TE_{11}$ optical mode and the second mode is a $TE_{31}$ optical mode.

Clause 14

The mode conversion waveguide system of according to clause 12 wherein the first mode is $TM_{11}$ optical mode and the second mode is a $TM_{31}$ optical mode.

Clause 15

The mode conversion waveguide system according to one of clauses 1, 2, 3, 4, 5, 6, 7, 8, 9, 10, 11, 12, 13, or 14, wherein a light having a first mode travels through the multimode waveguide and is input into the multimode interference region and is output from the multimode interference region into the single mode waveguide with a second mode.

Clause 16

The mode conversion waveguide system according to clause 12, wherein the second mode is $TE_{11}$ optical mode and the first mode is a $TE_{31}$ optical mode.

Clause 17

The mode conversion waveguide system according to clause 12, wherein the second mode is $TM_{11}$ optical mode and the first mode is a $TM_{31}$ optical mode.

Clause 18

A method for converting a mode of a light, the method comprising:
  sending the light through a single mode waveguide, wherein the light has a first mode while traveling through single mode waveguide;
  sending the light from the single mode waveguide into a multimode interference region having connected to the single mode waveguide
  reflecting the light with a cavity within the multimode interference region in a manner that causes the light to propagate away from the single mode waveguide; and
  outputting the light from multimode interference region, wherein the light has a second mode.

Clause 19

The method according to clause 18 further comprising:
  sending the light output from the multimode interference region into a multimode waveguide.

Clause 20

The method according to one of clauses 18 or 19, wherein the multimode interference region has a shape that is symmetric about a plane for the multimode interference region.

Clause 21

The method according to one of clauses 18, 19, or 20, wherein the cavity is symmetric about an axis extending centrally through the multimode interference region.

Clause 22

The method according to one of clauses 18, 19, 20, or 21, wherein the cavity is one of void enclosed within the multimode interference region, a hole extending into the multimode interference region, and the hole extending through the multimode interference region.

Clause 23

The method according to one of clauses 18, 19, 20, 21, or 22, wherein the multimode interference region is comprised of a first material and the cavity is filled a second material different from the first material.

Clause 24

The method according to one of clauses 18, 19, 20, 21, 22, or 23, wherein the multimode interference region comprises a cladding and a core region within the cladding, wherein the cavity is located in the core region in the multimode interference region and is filled with a cladding material for the cladding.

Thus, the illustrative examples by a method, apparatus, and system for converting the mode of a signal such as light. The light is sent through a single mode waveguide, wherein the light has a first mode while traveling through single mode waveguide. The light is sent from the single mode waveguide into a multimode interference region having connected to the single mode waveguide. The light is reflected with a cavity within the multimode interference region in a manner that causes the light to propagate away from the single mode waveguide. The light is output from multimode interference region, wherein the light has a second mode.

In the illustrative examples, the cavity in the multimode interference region is configured to increase the efficiency at which mode conversion occurs. In the illustrative examples, the cavity can have a shape and location that increases the sufficiency and can also reduce issues with differences in the refractive index in the mode conversion waveguide system with respect to desired refractive index for the optical signals propagating through the mode conversion waveguide system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A mode conversion waveguide system comprising:
   a single mode waveguide;
   a multimode waveguide;
   a multimode interference region, wherein the multimode interference region is optically coupled to the single mode waveguide and is optically coupled to the multimode waveguide, and wherein the multimode interference region is positioned between the single mode waveguide and the multimode waveguide; and
   a cavity in the multimode interference region, wherein the cavity is a void enclosed within the multimode interference region, and wherein the cavity is configured to cause a light having a first mode, traveling into the multimode interference region, to reflect within the multimode interference region in a manner that causes the light to have a second mode at an output of the multimode interference region.

2. The mode conversion waveguide system of claim 1, wherein the multimode interference region is comprised of a first material and the cavity is filled with a second material different from the first material.

3. The mode conversion waveguide system of claim 1, wherein the multimode interference region comprises a cladding and a core region within the cladding, wherein the cavity is located in the core region in the multimode interference region and is filled with a cladding material for the cladding.

4. The mode conversion waveguide system of claim 1, wherein the multimode interference region has a first width that is larger than a second width of the multimode waveguide.

5. The mode conversion waveguide system of claim 1, wherein the multimode waveguide tapers such that a width of the multimode waveguide is greater at a connection of the multimode waveguide to the multimode interference region to than the width of the multimode waveguide at a location away from the connection of the multimode waveguide to the multimode interference region.

6. The mode conversion waveguide system of claim 1, wherein the multimode waveguide comprises:
   a first section connected to the multimode interference region; and
   a second section connected to the first section, wherein the first section has a first cross section and the second section has a second cross section that is different from the first cross section.

7. The mode conversion waveguide system of claim 6, wherein the first cross section is comprised of silicon nitride and the second cross section is comprised of central region of lithium niobate located between a first side region of silicon nitride and a second side region of the silicon nitride.

8. The mode conversion waveguide system of claim 1, wherein a light having a first mode travels through the single mode waveguide and is input into the multimode interference region and is output from the multimode interference region into the multimode waveguide with a second mode.

9. The mode conversion waveguide system of claim 8 wherein the first mode is a $TE_{11}$ optical mode and the second mode is a $TE_{31}$ optical mode.

10. The mode conversion waveguide system of claim 8 wherein the first mode is a $TM_{11}$ optical mode and the second mode is a $TM_{31}$ optical mode.

11. The mode conversion waveguide system of claim 8, wherein the second mode is a $TE_{11}$ optical mode and the first mode is a $TE_{31}$ optical mode.

12. The mode conversion waveguide system of claim 8, wherein the second mode is a $TM_{11}$ optical mode and the first mode is a $TM_{31}$ optical mode.

13. The mode conversion waveguide system of claim 1, wherein a light having a first mode travels through the multimode waveguide and is input into the multimode interference region and is output from the multimode interference region into the single mode waveguide with a second mode.

14. The mode conversion waveguide system of claim 1, wherein a center of the single mode waveguide and a center of the multimode waveguide and a center of the multimode interference region and a center of the cavity within the multimode interference region are all aligned with respect to an axis in a direction the light travelling therethrough.

15. The mode conversion waveguide system of claim 1, wherein the multimode interference region has only a single input port and only a single output port, wherein the multimode interference region is optically coupled to the single mode waveguide through the single input port and is optically coupled to the multimode waveguide through the single output port.

16. The mode conversion waveguide system of claim 1, wherein the multimode interference region has only a single input port and only a single output port, wherein the multimode interference region is optically coupled to the single mode waveguide through the single input port and is optically coupled to the multimode waveguide through the single output port.

17. A mode conversion waveguide system comprising:
a single mode waveguide;
a multimode waveguide;
a multimode interference region, wherein the multimode interference region is optically coupled to the single mode waveguide and is optically coupled to the multimode waveguide, and wherein the multimode interference region is positioned between the single mode waveguide and the multimode waveguide; and
a cavity in the multimode interference region, wherein the cavity is symmetric about the axis extending centrally through the multimode interference region and is configured to cause a light having a first mode, traveling into the multimode interference region, to reflect within the multimode interference region in a manner that causes the light to have a second mode at an output of the multimode interference region.

18. The mode conversion waveguide system of claim 17, wherein the multimode interference region is comprised of a first material and the cavity is filled with a second material different from the first material.

19. The mode conversion waveguide system of claim 17, wherein the multimode waveguide tapers such that a width of the multimode waveguide is greater at a connection of the multimode waveguide to the multimode interference region to than the width of the multimode waveguide at a location away from the connection of the multimode waveguide to the multimode interference region.

20. The mode conversion waveguide system of claim 17, wherein a center of the single mode waveguide and a center of the multimode waveguide and a center of the multimode interference region and a center of the cavity within the multimode interference region are all aligned with respect to an axis in a direction the light travelling therethrough.

* * * * *